US012792335B2

(12) United States Patent
Mesde et al.

(10) Patent No.: US 12,792,335 B2
(45) Date of Patent: Nov. 10, 2026

(54) VEHICLE APPLICATION DEPLOYMENT PLANNER

(71) Applicant: Amazon Technologies, Inc., Seattle, WA (US)

(72) Inventors: Roland Mesde, Cupertino, CA (US); Alex Bessonov, San Jose, CA (US); Paolo Gruenberg Hilario, West Linn, OR (US); Nitin Giri, Bothell, WA (US); Stefano Marzani, Mountain View, CA (US); Gautam Kumar Mani, San Francisco, CA (US); Brian Ewanchuk, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 528 days.

(21) Appl. No.: 18/065,565

(22) Filed: Dec. 13, 2022

(65) Prior Publication Data

US 2024/0192943 A1 Jun. 13, 2024

(51) Int. Cl.
*G06F 8/65* (2018.01)

(52) U.S. Cl.
CPC .................................... *G06F 8/65* (2013.01)

(58) Field of Classification Search
None
See application file for complete search history.

(56) References Cited

U.S. PATENT DOCUMENTS

| | | | | |
|---|---|---|---|---|
| 6,820,259 | B1 * | 11/2004 | Kawamata | G06F 8/61 717/173 |
| 8,595,187 | B1 | 11/2013 | McLennan | |
| 8,719,782 | B2 | 5/2014 | DeHaan | |
| 9,170,798 | B2 | 10/2015 | Nagaraja et al. | |
| 9,176,561 | B2 * | 11/2015 | Lee | G06F 8/65 |
| 9,880,837 | B2 | 1/2018 | Khazanchi et al. | |
| 10,554,637 | B1 | 2/2020 | Bendersky et al. | |
| 10,698,676 | B2 * | 6/2020 | Kröselberg | G06F 21/57 |

(Continued)

OTHER PUBLICATIONS

H. Guissouma, C. P. Hohl, F. Lesniak, M. Schindewolf, J. Becker and E. Sax, "Lifecycle Management of Automotive Safety-Critical Over the Air Updates: A Systems Approach," in IEEE Access, vol. 10, pp. 57696-57717, Jun. 6, 2022. (Year: 2022).*

(Continued)

*Primary Examiner* — Andrew M. Lyons
(74) *Attorney, Agent, or Firm* — Alexander A. Knapp; Kowert, Hood, Munyon, Rankin & Goetzel, P.C.

(57) ABSTRACT

A system comprising one or more computing devices implements a vehicle application deployment planner. The vehicle application deployment planner may utilize received vehicle information to dynamically generate one or more vehicle deployment plans to send to respective vehicles. The deployment plans may also be dynamically updated based on newly received vehicle information. The application deployment planner may generate updated deployment plans for already deployed applications in response to chances in vehicle conditions as indicated in the received vehicle information. In some embodiments, the deployment plan may be processed by an in-vehicle application deployment planner/orchestrator of the vehicle to deploy the particular vehicle software application.

20 Claims, 14 Drawing Sheets

(56) References Cited

U.S. PATENT DOCUMENTS

| | | | | |
|---|---|---|---|---|
| 11,314,495 | B2 | 4/2022 | Francis | |
| 2004/0088698 | A1 | 5/2004 | Claiborne | |
| 2015/0073697 | A1* | 3/2015 | Barrett | G01S 19/48 701/494 |
| 2017/0109152 | A1* | 4/2017 | Pissey | G06F 8/654 |
| 2017/0259762 | A1* | 9/2017 | Zoeller | B60R 25/24 |
| 2017/0364046 | A1 | 12/2017 | Westrick, Jr | |
| 2018/0081670 | A1* | 3/2018 | Caushi | G07C 5/00 |
| 2018/0322014 | A1* | 11/2018 | Persson | G06F 8/61 |
| 2019/0087169 | A1* | 3/2019 | Arai | G06F 11/00 |
| 2019/0205115 | A1 | 7/2019 | Gomes | |
| 2019/0324858 | A1* | 10/2019 | Sarkar | H04L 67/34 |
| 2019/0384870 | A1 | 12/2019 | Shiraishi et al. | |
| 2019/0391800 | A1* | 12/2019 | Lin | G06F 8/65 |
| 2020/0218531 | A1* | 7/2020 | Kushwaha | G06F 8/66 |
| 2021/0026617 | A1* | 1/2021 | Maru | G06F 8/65 |
| 2022/0078077 | A1 | 3/2022 | Mifsud | |
| 2022/0171613 | A1 | 6/2022 | Goto | |
| 2022/0317995 | A1* | 10/2022 | Nagamitsu | B60W 50/06 |
| 2023/0082123 | A1* | 3/2023 | Yamamoto | G06F 8/65 717/118 |
| 2023/0168882 | A1* | 6/2023 | Ogino | G06F 8/65 |
| 2023/0214290 | A1* | 7/2023 | Scrivano | G06F 16/1748 714/807 |
| 2023/0229417 | A1* | 7/2023 | Qian | G06F 21/572 717/170 |
| 2023/0236822 | A1* | 7/2023 | Liu | H04W 4/50 |
| 2024/0143311 | A1* | 5/2024 | Ishikawa | G06F 8/65 |

OTHER PUBLICATIONS

Han, S., He, Y. and Ding, Y., "Enable an Open Software Defined Mobility Ecosystem through VEC-OF," Jul. 8, 2020, arXiv: 2007.03879v1. (Year: 2020).*

U.S. Appl. No. 18/334,716, filed Jun. 14, 2023, Roland Mesde, et al.

International Search Report and Written Opinion mailed Mar. 19, 2024 in PCT/US2023/082693, Amazon Technologies, Inc., pp. 1-12.

Stefan Boschert, "Next Generation Digital Twin," Conference Paper May 2018, ResearchGate, in Proceedings of TMCE 2018, pp. 209-218.

U.S. Appl. No. 18/065,563, filed Dec. 13, 2022, Roland Mesde, et al.

U.S. Appl. No. 17/710,585, filed Mar. 31, 2022, Roland Mesde, et al.

U.S. Appl. No. 17/710,634, filed Mar. 31, 2022, Roland Mesde, et al.

U.S. Appl. No. 17/710,644, filed Mar. 31, 2022, Roland Mesde, et al.

U.S. Appl. No. 17/806,434, filed Jun. 10, 2022, Roland Mesde, et al.

U.S. Appl. No. 17/809,878, filed Jun. 29, 2022, Roland Mesde, et al.

U.S. Appl. No. 17/809,868, filed Jun. 29, 2022, Roland Mesde, et al.

U.S. Appl. No. 17/160,184, filed Jan. 27, 2021, Assimakis Tzamaloukas, et al.

U.S. Appl. No. 17/037,376, filed Sep. 29, 2020, Michael Garcia, et al.

U.S. Appl. No. 17/710,551, filed Mar. 31, 2022, Rloand Mesde, et al.

U.S. Appl. No. 17/810,301, filed Jun. 30, 2022, Roland Mesde, et al.

U.S. Appl. No. 17/727,592, filed Apr. 22, 2022, Brett Francis.

* cited by examiner

VEHICLE APPLICATION DEPLOYMENT PLANNER

BACKGROUND

Modern vehicles, such as cars, trucks, motorcycles, etc. are often manufactured with electronic sensors and include computer systems programmed with control algorithms that take inputs from such electronic sensors to determine various control actions to be taken for the vehicle or systems implemented in the vehicles. Some vehicles may include multiple electronic control units (ECUs) and various sensor modalities. Additionally, deployment of a vehicle software application may require that the vehicle software application be compatible with an execution environment of a particular ECU that the vehicle software application will be deployed in. Moreover, a communication format a vehicle uses to receive a vehicle software application may restrict or slowdown the transfer of a software application to a vehicle.

Figure 1:
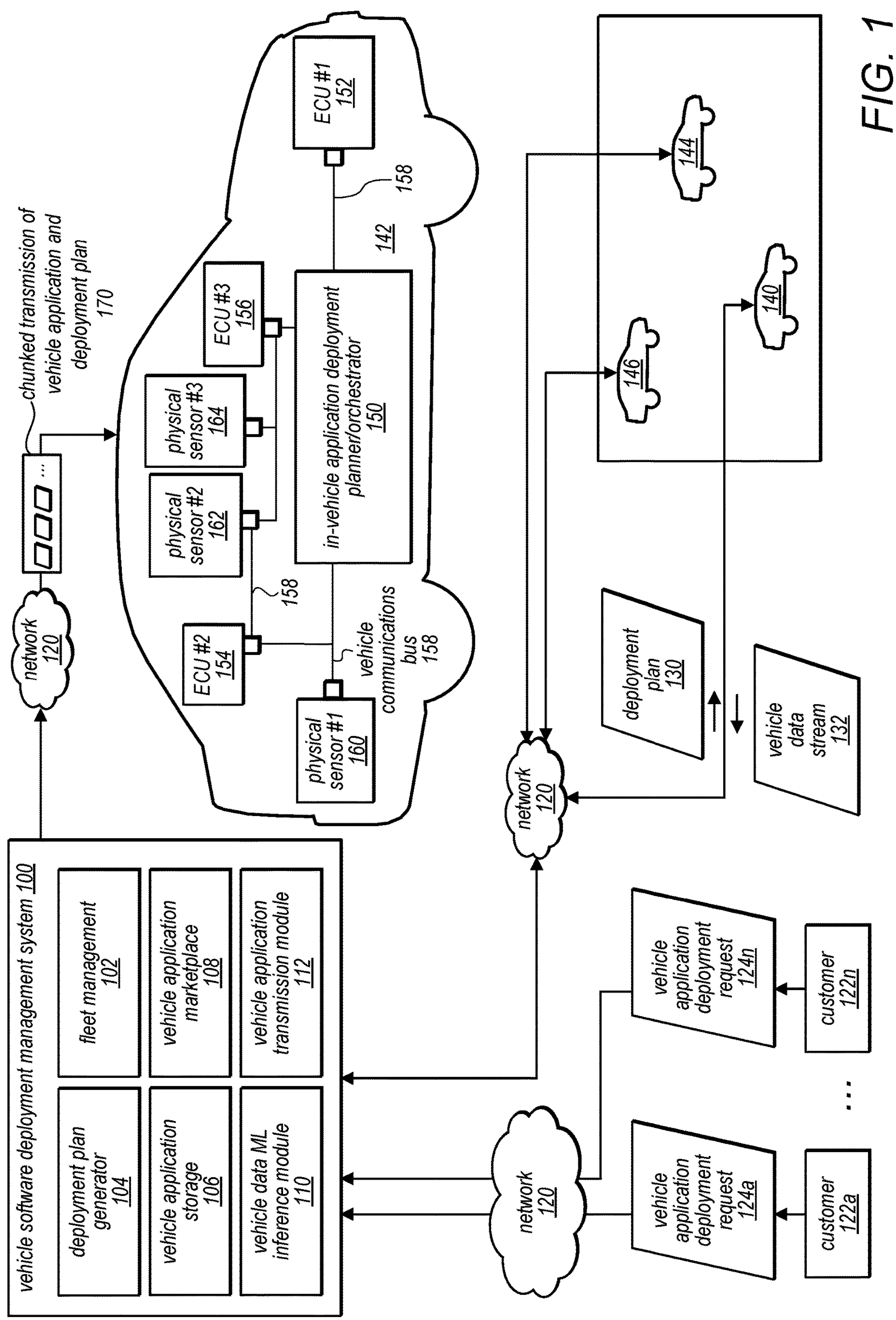
FIG. 1 illustrates a vehicle software deployment management system that sends signed serialized data chunks of a vehicle software application and a deployment plan for the software application to vehicles using a protocol agnostic transmission format, and/or dynamically generates and sends, based on received streams of vehicle data, a deployment plan for deploying the vehicle software application, according to some embodiments.

While embodiments are described herein by way of example for several embodiments and illustrative drawings, those skilled in the art will recognize that embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (e.g., meaning having the potential to), rather than the mandatory sense (e.g., meaning must). Similarly, the words "include," "including," and "includes" mean including, but not limited to.

DETAILED DESCRIPTION OF EMBODIMENTS

The systems and methods described herein include techniques for implementing a vehicle software deployment management system that sends signed serialized data chunks of a vehicle software application and a deployment plan for the vehicle software application to a vehicle and/or in-vehicle application deployment planner/orchestrator of the vehicle. The in-vehicle application deployment planner/orchestrator is configured to receive both the signed serialized chunks and associated deployment plan for the vehicle software application and generate a local deployment plan for deploying components of the in-vehicle software application.

For example, modern vehicles are equipped with various electronic control units (ECUs), various types of buses that may use a plurality of in-vehicle communication protocols and that may be arranged in the vehicles in various configurations. Additionally, along with a large amount of variability with regard to vehicle environment configurations, vehicle software applications that are requested to be deployed in the vehicle may be large and complex with multiple components that are required to be deployed in a specific manner across various ones of the ECUs of the vehicles that may be arranged in different configurations that vary vehicle to vehicle. Moreover, deployment of the vehicle software may be further complicated by the software components involved in the deployment of the vehicle software having multiple dependencies. For example, a vehicle software application that is requested to be deployed may be a distributed application that requires its components to be deployed in a specific sequence due to the various components' dependencies. Note that the dependencies may include dependencies between software components, for example component A must be deployed prior to component B, as an example. Also, the dependencies may also include software/hardware dependencies or networking/software dependencies. For example, software component A may have a dependency that requires it to be deployed on an ECU with a direct bus connection to another ECU used to deploy software component B, as an example. Also, dependencies may include purely hardware dependencies, such as software component A requires installation on an ECU with a processor having X capacity, while software component B requires installation on an ECU with a processor having Y capacity, as an example.

As can be seen, the deployment of a vehicle software application, including distributed applications, in vehicle environments that encompass a wide range of combinations of vehicle hardware and software presents a non-trivial challenge.

Also, a vehicle software deployment planner of the vehicle software deployment management system (e.g., residing in the cloud, as an example) may coordinate the deployment of the vehicle software application using the deployment plan. For example, a deployment plan may instruct specific ones of the software application component to be deployed in specific ECUs based on relationship of dependencies of each of the components. In addition to determining the sequence of deployment, the vehicle software deployment planner may determine an optimal vehicle application deployment configuration based on vehicle data such as available compute resources of the ECUs, number of CPU cores, memory, cache, storage of the ECUs etc. For example, the deployment plan may instruct the vehicle software application to be deployed to an ECU with greater processing power available versus another ECU that is viable but less optimal due to a lower available processing power. The vehicle software deployment planner may be able to coordinate the deployment of the vehicle software application in an optimal configuration using the deployment plan. In some embodiments, a level of detail included in the deployment plan may vary. For example, some deployment plans may include a high-level of specificity determined by the vehicle software deployment management system (e.g., residing in the cloud), while other deployment plans may include general deployment instructions, wherein more granular determinations are made at the vehicle level, for example by an in-vehicle application deployment planner/orchestrator. As an example, a more detailed deployment plan may specify particular ECUs of a vehicle that are to be used for deployment, whereas a more general (e.g., less granular) deployment plan may specify characteristics of ECUs that are to be used for particular software components and the selection of particular ECUs based on these characteristics may be left to the in-vehicle application deployment planner/orchestrator to determine.

Moreover, in some embodiments, the vehicle software application may be large such that its size hinders the transfer of the vehicle application software and the deployment plan in a single network transmission unit, such as a payload of a data packet. In some embodiments, the vehicle software deployment management system may generate a signed serialized set of data chunks for the vehicle software application and/or deployment plan to send to the in-vehicle application deployment planner/orchestrator to be reconstructed incrementally. The use of the serialization and signatures may provide a mechanism for the in-vehicle application deployment planner/orchestrator to confirm that all relevant chunks have been received, even if sent using various different packets that may be delivered out of order, etc. Also, the use of the serialization may enable the in-vehicle application deployment planner/orchestrator to conform that packets were not lost in transmission. The chunks may be received and queued at the vehicle and assembled by the in-vehicle application deployment planner/orchestrator. The use of data chunks reduces the size of the individual data packages that must be transmitted and allows greater flexibility with regard to the types of transmission protocols and communication networks that may be used to send the vehicle application software.

In some embodiments, the deployment plan may be determined by a vehicle software deployment planner in a server (e.g., cloud server), such that a server-based vehicle software deployment planner dynamically receives vehicle information and generates the deployment plan based on the relevant vehicle information received. In embodiments where the server-based deployment planner is used, the deployment plan may contain more granular deployment details, such as the relevant instructions/execution plans for an in-vehicle deployment planner/orchestrator to orchestrate and relay to deploy the vehicle software application according to the deployment plan. In other embodiments, the in-vehicle deployment planner/orchestrator may receive a more generalized deployment plan and may generate a more detailed deployment plan locally at the vehicle based on vehicle information available in the vehicle. In some embodiments, a partial deployment plan for a portion of the vehicle software application may be generated by the in-vehicle deployment planner/orchestrator.

FIG. 1 illustrates a vehicle software deployment management system that sends signed serialized data chunks of a vehicle software application and a deployment plan for the vehicle software application to one or more vehicles using a protocol agnostic transmission format, and/or dynamically generates and sends, based on received streams of vehicle data, a deployment plan for deploying the vehicle software application, according to some embodiments.

A vehicle system may include a vehicle software deployment management system 100 and network 120 that are connected to vehicles 140, 142, 143, and 144. Although FIG. 1 illustrates four vehicles 140, 142, 143, and 144 connected to the vehicle software deployment management system 100 via the network 120, this illustration is intended only as an example and it should be understood that any number of vehicles may form a fleet of vehicles connected to the network 120. In some embodiments, network 120 may be connected to vehicles that contain various components configured to send and receive signals using different vehicle signal formats and/or that include various ECU environments. In some embodiments the vehicles may use a homogeneous vehicle signal format and/or a homogenous set of ECUs. Customers 122*a* through 122*n* may furthermore, be connected to vehicle software deployment management system via the network 120. Customers 122*a* through 122*n* may be vehicle suppliers or vehicle component suppliers (e.g., vehicle original equipment manufacturers (OEMs) and/or parts suppliers). Network 120 may be a private or public network such as a direct connect connection to a service provider network hosting the vehicle software deployment management system 100, or an Internet connection. Network 120 may furthermore be a wireless network, such as a cellular network, Wi-Fi network or other wireless network. In some embodiments the vehicles 140, 142, 143, and 144 may be connected to multiple types of networks 120 and not just to one type of network 120.

In some embodiments, the vehicle software deployment management system 100 may include a deployment plan generator 104, a fleet management system 102, a vehicle application storage 106, a vehicle application marketplace 108, a vehicle data ML inference module 110, and a vehicle application transmission module 112. The deployment plan generator 104 may generate a deployment plan 130 for a single vehicle, such as the vehicle 142, or a fleet of vehicles 140, 142, 144, and 146 based on the vehicle application deployment requests 124*a*-124*n*. With regard to a vehicle software application that is to be deployed, the deployment plan generator 104 may obtain the vehicle software application that is to be deployed from a vehicle application storage 106, external application storage 206 (shown in FIG. 2), and/or directly from the customer 122. In some embodiments, the vehicle software application to be deployed may be provided using Open Container Initiative (OCI) images that are compatible with ECUs in a vehicle in which the vehicle software application is to be deployed. In some embodiments, the vehicle application marketplace 108 may expose various vehicle applications allowed to be deployed to a given vehicle for the customers 122*a*-122*n*. The customers 122*a*-122*n* may indicate in a vehicle application deployment request a particular application to deploy to the vehicle. Although not illustrated, in some embodiments, a control plane of the vehicle software deployment management system 100 allows customers 122*a*, 122*n* to perform various actions required to deploy one or more vehicle software application as well as update the deployment plans. A control plane of the vehicle software deployment management system 100 may register vehicles, model vehicles (e.g., manage vehicle shadows), and manage data across a single vehicle or a fleet of vehicles. The deployment plan generator 104, vehicle application storage 106, and the vehicle application marketplace 108 will be further discussed in FIG. 2 and FIG. 5.

In some embodiments, the deployment plan generator 104 may generate a deployment plan for a vehicle software application to be implemented using software included in containers having an Open Container Initiative (OCI) image format. The deployment plan generator 104 may generate a deployment plan 130 that may be processed by an in-vehicle application deployment planner/orchestrator 150 of the vehicle 142 to deploy the particular vehicle software application. In some embodiments, the in-vehicle application deployment planner/orchestrator 150 may include one or more subsystems that processes deployment plans sent from the vehicle software deployment management system 100, and may create localized ECU execution plans based on metadata that are obtained from the ECUs in the vehicle through one or more ECU agents deployed at the ECUs. In some embodiments, the deployment plan 130 sent to the vehicle may create one or more localized ECU execution plans that are then transmitted by an in-vehicle application deployment planner/orchestrator 150 to respective ECUs. In some embodiments, the execution plans may be transmitted according to a specific sequence to the respective ECUs. The in-vehicle application deployment planner/orchestrator 150 and local execution plans will be further discussed in FIG. 3.

In some embodiments, the vehicle application transmission module 112 may ingest one or more vehicle data streams 132 from the vehicles 140, 142, 144, and 146; decode the ingested one or more vehicle data streams; and transmit a deployment plan and/or vehicle applications to the respective vehicles. As further discussed herein, in some embodiments, the deployment plan may be adjusted based on the information provided in the one or more vehicle data streams 132. The vehicle application transmission module 112 may furthermore provide a vehicle side software development kit (SDK) or other collection of software development package to interpret deployment plans (or other messages) and interpret the vehicle software application (including OCI images of the application and dependencies) to a vehicle. The vehicle application transmission module 112 may furthermore include a first-in-first-out (FIFO) type queue storing signed serialized data chunks that have been generated based on an aggregated deployment plan. The signed serialized data chunks may be formatted in a way and the vehicle application transmission module may be configured to transmit the signed serialized data chunks such that the signed serialized data chunks can be relayed using any communication protocol/mechanism a customer prefers. The vehicle application transmission module 112 may generate a set of signed serialized data chunks of only the vehicle application, only the deployment plan, or both the deployment plan and the vehicle application. In some embodiments, the customer 122*a*-122*n* may indicate the desired size of the data chunks for transmission to the vehicles 140, 142, 144, and 146. For example, the chunked transmission of a vehicle application and a deployment plan 170 may be determined according to the respective vehicle application deployment requests 124*a*-124*n* of the respective customers 122*a*-122*n*. In some embodiments, the chunks may be signed so as to enable verification by the in-vehicle application deployment planner/orchestrator 150 that the received data chunks are sent by a correct entity. In some embodiments, a third-party application may utilize a cloud-side SDK to interact with the vehicle software deployment management system 100 and transmit the signed serialized data chunks to any of the connected vehicles. Furthermore, in some embodiments, the vehicle software deployment management system 100 may communicate with the vehicles using one or more protocols including a Message Queuing Telemetry Transport (MQTT) protocol, a Constrained Application Protocol (CoAP), an Extensible Messaging and Presence Protocol (XMPP), an Advanced Message Queuing Protocol (AMQP), and/or a Data Distribution Service (DDS).

In some embodiments, in-vehicle application deployment planner/orchestrator 150 may implement a gateway for vehicle 142 to receive the chunked transmission of the vehicle application and the deployment plan 170. Although not illustrated in detail, the in-vehicle application deployment planner/orchestrator 150 may be implemented in an ECU or other computing unit of the vehicle 142. The in-vehicle application deployment planner/orchestrator 150 may provide an in-vehicle receive module (such as the in-vehicle receive module 314 discussed in FIG. 3). Also, the in-vehicle deployment planner 150 may allow the vehicle to process the signed serialized data chunks transmitted through the communication protocol/mechanism utilized to transmit the signed serialized data chunks in a protocol agnostic manner. The in-vehicle application deployment planner/orchestrator 150 may incrementally reconstruct the deployment plan and application packages/container images to be used to implement the in-vehicle application based on the chunked data sent to the vehicle. Once the chunked transmission of the deployment plan and the vehicle application are received, in-vehicle application deployment planner/orchestrator 150 may incrementally reconstruct the deployment plan and the application packages/container images using the received chunks. In some embodiments, the data chunks may be verified and routed to a package manager for application reconstruction (including OCI image reconstruction) and/or an ECU task delegator for the plan execution (as discussed in FIG. 3-4). In some embodiments, the deployment plans may not be processed for execution until the prerequisite OCI images are fully reconstructed in the local repository. In some embodiments, the in-vehicle application deployment planner/orchestrator 150 may use a multi-protocol communication broker to interact with ECU agents in one or more ECUs of the vehicle.

In some embodiments, a vehicle communications bus 158 of the vehicle 142 may transmit vehicle information sent from various components of a vehicle, such as electronic control unit 152 (ECU #1), electronic control unit 154 (ECU #2), and electronic control unit 156 (ECU #3). Additionally, other components, such as physical sensor #1 160, physical sensor #2 162, and physical sensor #3 163 may be connected to one or more of the vehicle communications buses 158 and/or ECUs of the vehicle. In some embodiments the various physical sensors may include audio/visual sensors that obtain audio/visual information and may communicate such information over the vehicle communications bus 138. In some embodiments, the various physical sensors 160, 162, and 164 may include a location sensor that is able to obtain the location of the vehicle. In some embodiments the location sensor may be a Global Positioning System (GPS) using cellular, wireless passive, satellite, and other types of GPS systems. The location sensor may obtain location information that is further processed by the in-vehicle application deployment planner/orchestrator 150 before being transmitted over the network to the vehicle software deployment management system 100. In some embodiments, the various physical sensors may be connected to multiple vehicle communications buses and/or physical sensors. For example, in the vehicle 142, physical sensor 162 (physical sensor #2) may be connected to ECU 154 (ECU #2) as well as ECU 156 (ECU #3) via the vehicle communications bus 158. Various vehicle communications bus 158 connections may provide alternate sensor signal paths. As will be further discussed in FIG. 3 various portions of the vehicle communication buses 158 may be different types of buses and/or buses that use different types in-vehicle communication protocols. The in-vehicle communications protocols used in the vehicle 142 may include a controller area network (CAN) protocol, a remote procedure call (RPC) protocol, a controller area network flexible data-rate (CAN FD) protocol, a low-speed CAN protocol, a high-speed CAN protocol, a Society of Automotive Engineers (SAE) J1939 protocol, a CANopen protocol, and/or an on-board diagnostics (OBD) protocol.

The various vehicles 140, 142, 144, and 146 may generate vehicle data stream 132 containing various pieces or types of vehicle information that are sent to the vehicle software deployment management system 100. The in-vehicle application deployment planner/orchestrator 150 may send various diagnostic data for the vehicle 142, including information generated by the physical sensor #1 (160), physical sensor #2 (162), and physical sensor #3 (164), and/or an ECU configuration of the vehicle 142 including an ECU #1 (154), ECU #2 (156), and/or ECU #3 (158) configuration. The vehicle application transmission module 112 may directly ingest vehicle data stream 132 and decode the information. For example, in some embodiments, the extracted vehicle data may include compressed data such as video frames, images, radar amplitude, temperature data, engine speed, driver's performance, and/or other information about the vehicle that may be decoded into usable vehicle data that may be used by the vehicle software deployment management system 100. In some embodiments, the vehicle data may be enriched with other vehicle information. The vehicle software deployment management system 100 may utilize the received vehicle information to dynamically generate one or more updated vehicle deployment plans 130 to send to respective vehicles.

The deployment plan generator 104 of the vehicle software deployment management system 100 may dynamically generate deployment plans that allow for ongoing optimization of deployment configurations for software applications within the respective vehicles. For example, the vehicle 142 may utilize an in-vehicle application deployment planner/orchestrator 150 to carry out newly optimized deployment plans to manage the application lifecycle and deployment destinations for containers used to implement one or more in-vehicle applications, including various ECUs of the vehicle 142 used to execute code included in the containers as further discussed in FIGS. 5-6. In some embodiments, the vehicle application deployment planner 150 may source an optimal deployment configuration from the vehicle software deployment management system 100 on an on-going basis and redeploy and/or re-allocate applications based on the dynamically updated deployment plans. One or more customers may determine and/or specify an application to deploy as well as a vehicle configuration to be used to optimize deployment of the application for using the fleet management 102 or the vehicle application marketplace 108. The deployment plan generator 104 may use a vehicle ECU configuration and diagnostic data, as well as an ML inference generated from vehicle data and other sources to determine an optimized configuration for deployment of an application on the vehicle as further discussed in FIG. 8. In some embodiments when the vehicle software deployment management system 100 is not able to be connected to the vehicle (e.g., situations where no internet connectivity is available for the vehicle), a localized execution plan may be utilized which prioritizes the availability of safety critical applications over non-safety critical applications.

In some embodiments, the fleet management 102 can utilize the vehicle data 132 to reconstruct a representation or state of the vehicle in a vehicle simulator, such as a virtual replica of a vehicle. The reconstructed representation may be used to test various vehicle software applications including testing the deployment of the vehicle software application as further discussed in FIG. 5. Moreover, in-vehicle application deployment planner/orchestrator 150 may use a deployment adapter interface to communicate with the different runtime environments that can be deployed in vehicle ECU partitions such as Autosar Classic, Autosar Adaptive, Android, OCI container frameworks, and/or WASM runtimes as further discussed in FIGS. 6A-6B.

Please note that the previous description of the vehicle software deployment management system and the in-vehicle application deployment planner/orchestrator is a logical description and thus is not to be construed as limiting as to the particular implementation or portions thereof. This specification continues with various examples of the vehicle software deployment management system and in-vehicle application deployment planner/orchestrator, including different components/modules, or arrangements of components/module that may be employed as part of implementing the system/planner. A number of different methods and techniques to implement protocol agnostic transmission of signed serialized transmission application packages/images and deployment plans are discussed, some of which are illustrated in accompanying flowcharts. A number of different methods and techniques to implement dynamic generation of deployment plans are also discussed, some of which are similarly illustrated in accompanying flowcharts. Finally, a description of an example computing system upon which the various components, modules, systems, devices, and/or nodes may be implemented is provided. Various examples are provided throughout the specification.

Figure 2:
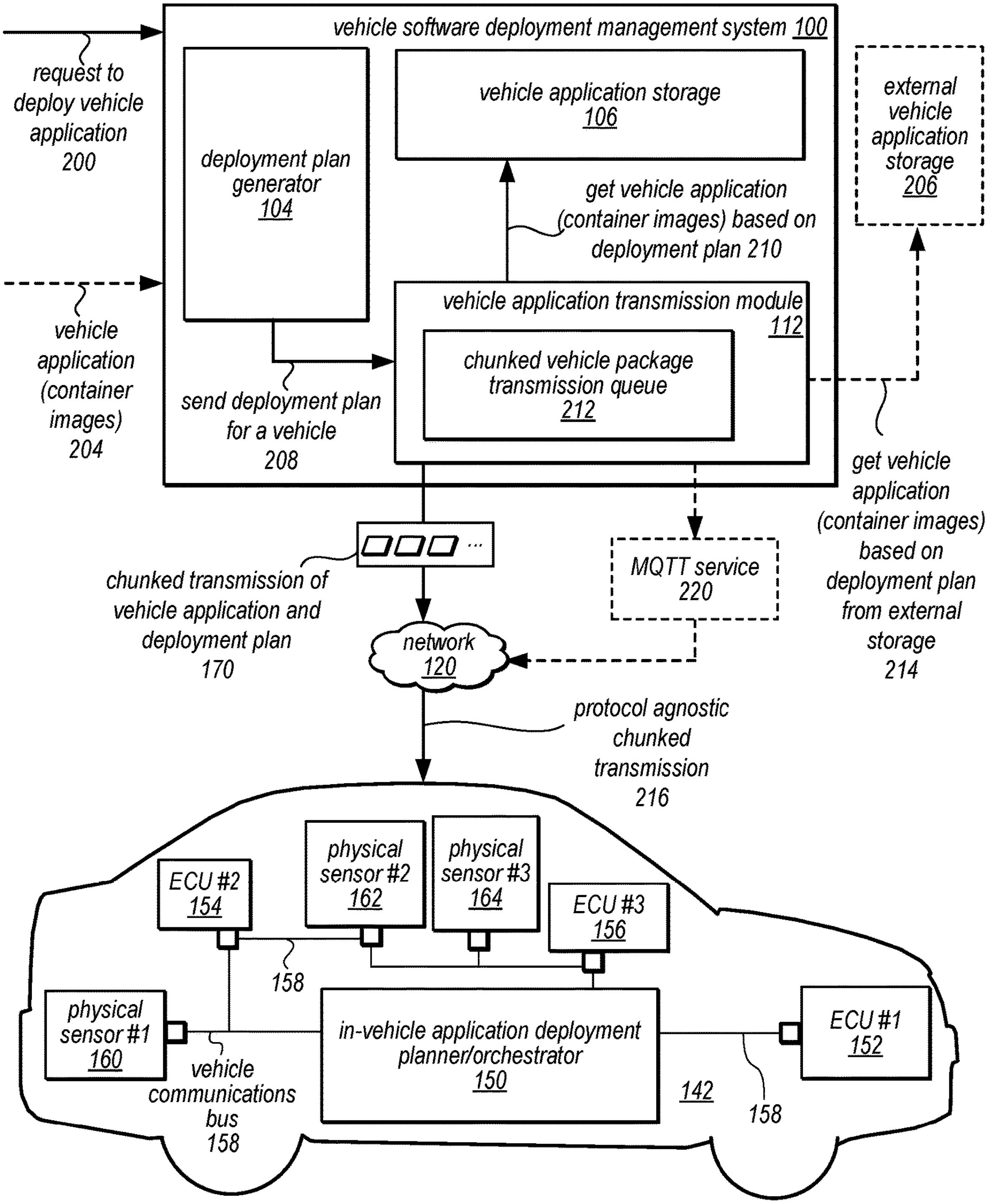
FIG. 2 illustrates a more detailed view of a vehicle software deployment management system, its various parts, and interactions to generate signed serialized data chunks of the vehicle application and/or deployment plan and sending the signed serialized data chunks to a vehicle using a protocol agnostic transmission format, according to some embodiments.

FIG. 2 illustrates a more detailed view of a vehicle software deployment management system, its various parts, and interactions to generate signed serialized data chunks of the vehicle application and/or deployment plan and sending the signed serialized data chunks to a vehicle using a protocol agnostic transmission format, according to some embodiments.

In FIG. 2, the vehicle software deployment management system 100 may receive a request to deploy vehicle application 200. In some embodiments, the request to deploy vehicle application 200 may be the vehicle application deployment request 124*a* from a customer 122*a* as illustrated in FIG. 1 or may be a request to deploy from another client. The request to deploy the vehicle application may indicate to the vehicle software deployment management system 100 a vehicle software application to be deployed to the vehicle 142. In some embodiments, instead of the request to deploy vehicle application 200, the vehicle software deployment management system 100 may receive a vehicle application 202 itself from the client/customer in addition to, or instead of, the indication of the vehicle software application to deploy. In some embodiments, the vehicle application 202 may include code included in one or more containers formatted in a OCI image format, to be deployed using a containerized computing environment. For example, the in-vehicle application deployment planner/orchestrator 150 may enable operating system (OS)-level virtualization or an OS paradigm in which a kernel allows the existence of multiple isolated software instances, called containers. The containerized environment may support various interpreted or compiled programming languages such as Ruby, Perl, Python, C, C++ and the like.

In some embodiments, the vehicle application 204 may be a custom vehicle application sent to the vehicle software deployment management system 100 together with a request to deploy the vehicle application 200. The vehicle application 204 may be added to the vehicle application storage 106 and/or an external vehicle application storage 106. The vehicle application storage 106 may be various kinds of object or file data stores for putting, updating, and getting data objects or files, including application packages, such as container images. For example, vehicle application storage 106 may be an object-based data store that allows for different data objects of different formats or types of data, such as vehicle software application files having an OCI format. In some embodiments, the application received may be a set of one or more custom application packages/container images that are not found in the vehicle application storage 206. The data objects in the vehicle application storage 206 may further include related dependent software packages (dependencies) including dependent OCI images. In some embodiments, the control plane of the vehicle software deployment management system 100 may be accessed via programmatic interfaces (e.g., APIs) or graphical user interfaces to manage the applications stored in the vehicle application storage 106.

Once the vehicle software deployment management system 100 receives a request to deploy vehicle application 200, where the application is identified in the request 200 (or included in the request 200), the deployment plan generator 104 may generate a deployment plan for deploying the application on the vehicle 208 and that may be used by the in-vehicle application deployment planner/orchestrator 150 to deploy the identified vehicle application as discussed in FIG. 1. In some embodiments, the vehicle application transmission module 112 may retrieve the vehicle application packages/container images based on indications included in deployment plan 210. In some embodiments, the vehicle application transmission module 112 may retrieve a catalog of the vehicle applications stored in the vehicle application storage 106 and retrieve the vehicle application according to the application as described in the catalog and various dependencies further identified in the catalog. In some embodiments, the vehicle application transmission module 112 may retrieve one or more portions of the vehicle application from the external vehicle application storage 214. Similar to retrieving the applications stored in the vehicle application storage 106, the vehicle application transmission module 112 may retrieve the vehicle application according to how the application components are described in an external vehicle application storage 206 catalog and various dependencies further identified in the external catalog (e.g., stored in external storage 206). In some embodiments, the vehicle application 204 may be directly provided to the vehicle application transmission module 112 from the deployment plan generator 104.

Once the vehicle application transmission module 112 obtains all of the vehicle application components/images, the vehicle application transmission module 112 may generate data chunks of the vehicle application and/or the deployment plan. The data chunks reduce the size of the individual data packages that must be transmitted and allow greater flexibility in the types of transmission protocols and communication networks that may be used. As discussed in FIG. 1, the data chunks may be signed and/or serialized and may be received by the in-vehicle application deployment planner/orchestrator 150 to deploy the application in the vehicle 142. In some embodiments, a specific signature associated with the signed chunks may be recognized by the in-vehicle application deployment planner/orchestrater 150 to verify that the signed chunks are from a correct entity and/or that the signed chunks have been received by a correct vehicle. In some embodiments, the data chunks may be encrypted such that the data chunks are able to be used at a vehicle having access to a correct encryption key but otherwise unusable by non-authorized entities. For example, the in-vehicle application deployment planner/orchestrater 150 may have access to a private key in a secure store such that the vehicle 142 is able to decrypt the encrypted data chunks, whereas other vehicles that are not specifically targeted may be unable to decrypt the data chunks. In some embodiments, the vehicle application transmission module may store the data chunks in a chunked vehicle package transmission queue 212 and send the chunked vehicle application and deployment plan using one or more of the various transmission protocols described in FIG. 1. In some embodiments, the vehicle application transmission module 112 may send the chunked vehicle application and deployment plan to the vehicle via an external data transmission service (such as a third-party over-the-air (OTA) service). In some embodiments, additional signing/encryption may be used by the external service used to transmit the data chunks. In some embodiments, a separate MQTT service 220 may be used by the vehicle application transmission module to transmit the chunked data. One or more of the data chunks may be sent using a protocol agnostic transmission format that is compatible with a plurality of different transmission protocols used for communications between the vehicle software deployment management system 100 and the vehicle 142. In some embodiments, the protocol agnostic transmission format may be a format that is compatible with various external data transmission service/OTA services utilizing plurality of different transmission protocols.

Figure 3:
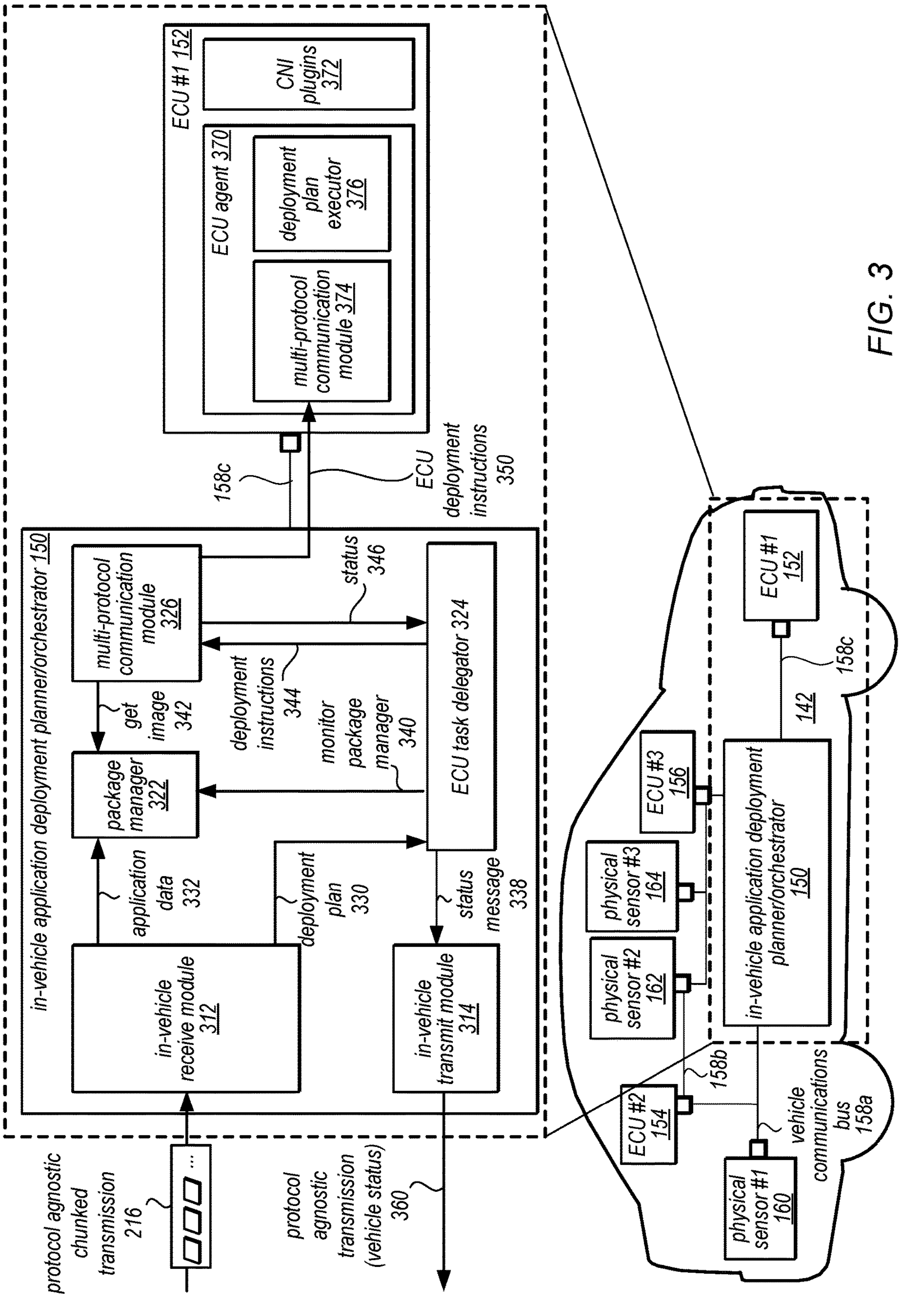
FIG. 3 illustrates a graphical view of an example in-vehicle application deployment planner/orchestrator of a vehicle that receives a deployment from a vehicle software deployment management system and/or receives signed serialized data chunks of a vehicle application to be deployed at the vehicle, wherein the in-vehicle application deployment planner/orchestrator enables deployment of the in-vehicle application in an execution environment of the vehicle, according to some embodiments.

FIG. 3 illustrates a graphical view of an example in-vehicle application deployment planner/orchestrator of a vehicle that receives a deployment from a vehicle software deployment management system and/or receives signed serialized data chunks of a vehicle application to be deployed at the vehicle, wherein the in-vehicle application deployment planner/orchestrator enables deployment of the in-vehicle application in a execution environment the vehicle, according to some embodiments.

In some embodiments, the in-vehicle application deployment planner/orchestrator 150 may include an in-vehicle receive module 312, in-vehicle transmit module 314, a package manager 322, an ECU task delegator 324, and a multi-protocol communication module 326. As discussed in FIG. 1, the vehicle communications buses 158 may include different types of buses and/or buses that use different types of in-vehicle communication protocols. For example, a first portion of the vehicle communication bus 158*a* may be a FlexRay bus, a second portion of the vehicle communication bus 158*b* may be an Ethernet/IP bus, and a third portion of the vehicle 142 vehicle communication bus 158*a* may be a CAN bus. In some embodiments, there may be multiple CAN buses (e.g., a CAN bus #1 and a CAN bus #2, etc.) and/or a local interconnect (LIN) bus. The vehicle communication buses may utilize the various in-vehicle communications protocols discussed in FIG. 1. For example, the CAN bus 158*c* may utilize a high-speed CAN protocol.

As illustrated in FIG. 3, the in-vehicle receive module 312 may receive the protocol agnostic chunked transmission 216 of the vehicle software application and the corresponding deployment plan generated by the vehicle software deployment management system 100. The in-vehicle receive module 312 may interface with the various networks that have network connections to the vehicle and receive the chunked transmission from any one or more of the various networks according to various communication protocols. The in-vehicle receive module 312 may send a received deployment plan 330 to the ECU task delegator 324 and send application data 332 to the packager manager. The application data 332 may be organized into chunks of the application and/or chunks of one or more application packages/container images received. The package manager 322 reconstructs the application components (such as container images) using the received application data 332 in order to deploy the application in the vehicle 142. In some embodiments, the ECU task delegator 324 may monitor the package manager 340 in order to verify the prerequisite application components, such as OCI images, are fully reconstructed before processing the deployment plans and sending one or more deployment instructions 344 to the multi-protocol communication module 326. The one or more deployment instructions 344 may be one or more execution plans for implementing the vehicle software application at the vehicle based on the received deployment plan.

In some embodiments, an execution plan may include specific instructions regarding relevant ECUs that are to be used to deploy the application (or a specific component of an application in a case for distributed vehicle software application that is not configured using containers) on the relevant ECUs. The ECU task delegator may generate individual localized execution plans to deploy the application (or the specific component of the application) for each of the ECUs. For example, the ECU task delegator may instruct the multi-protocol communication module 326 to get a relevant package/image 342 from the package manager 322 to deploy on ECU #1 (152) according to the deployment plan, and send the package/image to ECU #1 (152) along with ECU deployment instruction 350. The localized ECU execution plans may be transmitted to the appropriate ECUs, for example instead of being transmitted to all ECUs of the vehicle.

In some embodiments, the multi-protocol communication module 326 may enable translation of various vehicle communication bus 158 protocols to facilitate transfer of information within the vehicle. For example, the multi-protocol communication module 326 may send the ECU deployment instructions 350 along with a given image to be deployed to ECU #1 over the CAN bus 158*c* utilizing the high-speed CAN protocol. Once sent, a multi-protocol communication module 374 of the ECU agent 370 may receive the localized ECU deployment instructions 350 using the high-speed CAN protocol and allow the deployment plan executor of the ECU agent 370 to deploy the localized ECU deployment instructions.

In some embodiments, the ECU agent 370 may interact with the underlying components of the ECU #1 provided by a real-time operating system (RTOS) vendor or other a third-party ECU vendor to manage the lifecycle of the vehicle application. Furthermore, in some embodiments, the ECU agent 370 may provision various Container Network Interfaces (CNI) plugins 372 that extend capabilities of the ECU #1, such as enabling GPU sharing extensions, shared memory extensions, zero-copy inter process communication (IPC) extensions, etc. for the ECU #1. The multi-protocol communication module 326 may inform the ECU task delegator with a status 346 sent from the ECU agent 370 as to the status of the ECU (including the deployment status of the application). The ECU task delegator 324 may send a status message 338 to be sent from the vehicle 142 to one or more recipients. A protocol agnostic transmission 360 that contains the vehicle status may be sent by the in-vehicle transmit module 314 to the vehicle software deployment management system 100 or other recipients. The in-vehicle transmit module 314 may be similar to the in-vehicle receive module 312 in supporting various transmission protocols described in FIG. 1. In some embodiments, the separate MQTT service 220 may be used by the vehicle application transmission module to transmit the chunked data as discussed in FIG. 2. In some embodiments, the transmission 360 may be divided into data chunks by the in-vehicle transmit module 314 and sent using a protocol agnostic transmission format that is compatible with a plurality of different transmission protocols used for communications between the vehicle 142 and the vehicle software deployment management system 100. Although FIG. 3 illustrates the in-vehicle application deployment planner/orchestrator 150 interacting with only ECU #1 152, this is by way of example, and the in-vehicle application deployment planner/orchestrator 150 may be connected various other ones of the ECUs, sensors, and other vehicle components and may send respective ECU deployment instructions.

Figure 4:
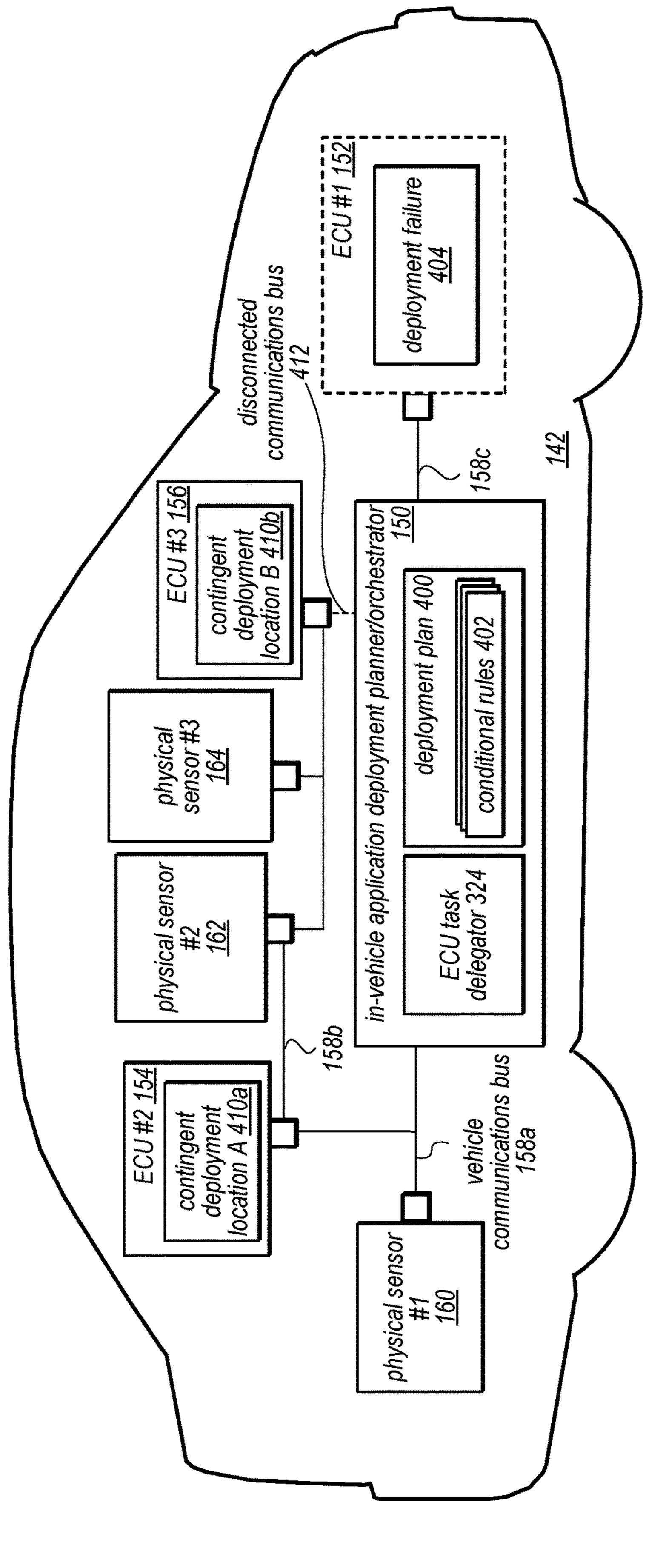
FIG. 4 illustrates a more detailed view of an in-vehicle application deployment planner/orchestrator for a vehicle and use of conditional rules of a deployment plan to deploy a vehicle software application, according to some embodiments.

FIG. 4 illustrates a more detailed view of an in-vehicle application deployment planner/orchestrator for a vehicle and use of conditional rules of a deployment plan to deploy a vehicle software application, according to some embodiments.

In some embodiments, the localized ECU execution plans that were discussed in FIG. 3 may be generated based on ECU environment metadata obtained from the ECU agents deployed on the various ECUs. For example, the in-vehicle application deployment planner/orchestrator 150 may receive a deployment plan 400 from the vehicle software deployment management system 100. Subsequent to generation of the localized execution plan to deploy the application to ECU #1 (152) as discussed in FIG. 3, the application may fail to deploy. In some embodiments, a metadata generated by the ECU #1 (152) indicating a deployment failure 404 may be communicated to the in-vehicle application deployment planner/orchestrator 150. Based on the metadata received, the ECU task delegator 324 may generate another localized execution plan to deploy the application in a contingent deployment location A (**410*a*) in ECU #2 154. In some embodiments, the ECU task delegator 324 may incorporate various other metadata in addition to an indication of failure to deploy an application, such as metadata indicating an ECU processing environment, including a capacity of compute resources of the ECU, types of containers the ECU supports, configurations of other applications deployed to the ECU, such as other containers implemented on the ECU, a number of CPU cores, memory, cache, storage, etc. of the ECU as well as any other performance characteristic of the ECU. For example, the ECU task delegator 324 may determine that instead of contingent deployment location A 410*a*, that the application is to be deployed to contingent deployment location B (410*b*) in ECU #3 156 upon determination that ECU #2 (154) would not provide a suitable processing environment when compared with ECU #3 (156). In some embodiments, other vehicle metadata may be used to determine the localized execution plan including sensor data and vehicle communications bus 158 metadata. For example, the ECU task delegator 324 may attempt to redeploy the application to ECU #1 (152) subsequent to receiving metadata regarding a disconnected communications bus 412 connecting ECU #3 156 to the ECU task delegator 324**.

In some embodiments, the ECU task delegator 324 may determine the localized execution plans based on conditional rules 402 provided in the deployment plan 400. For example, a conditional rule may state a pre-determined ECU as a contingent deployment location to be used for a given one of the container images (in instances wherein OCI container images are used) in response to a failure of deployment of that given container image. In some embodiments, the conditional rule may indicate a contingent deployment location for a given container image in response to a successful deployment of another one of the container images in the ECU of the plurality of ECUs. For example, upon a successful deployment of application to ECU #1, another application may be configured to be deployed to ECU #2. In some embodiments, the conditional rule may indicate selecting a deployment location for a given container image based on respective states, characteristics, and/or configurations of the ECUs of the vehicle. Various other conditional rules may determine how one or more application may be deployed.

Figure 5:
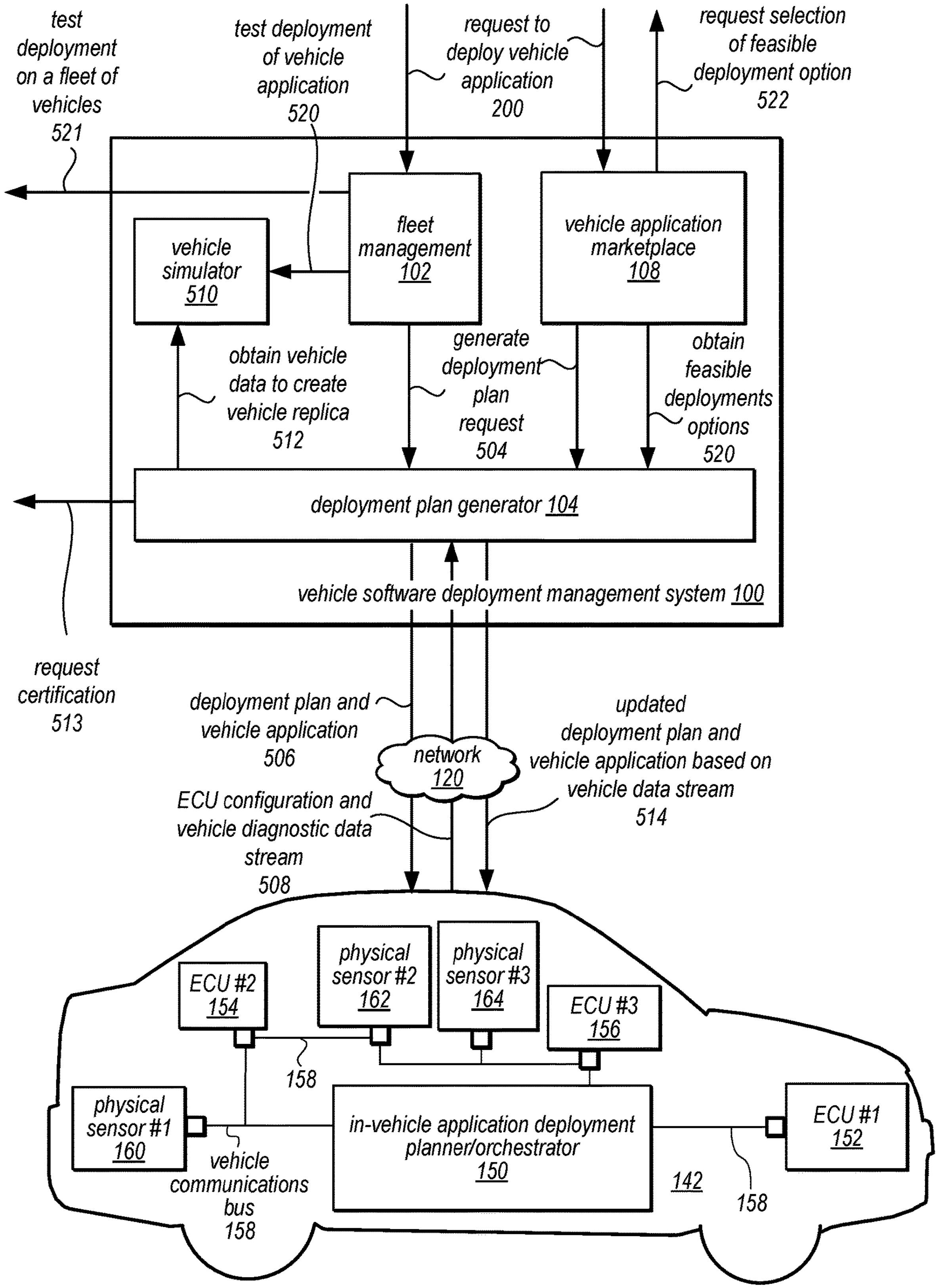
FIG. 5 illustrates a more detailed view of a vehicle software deployment management system, its various parts, and interactions to dynamically generate and send, based on streams of vehicle data, deployment plans for deploying a vehicle software application, according to some embodiments.

FIG. 5 illustrates a more detailed view of a vehicle software deployment management system, its various parts, and interactions to dynamically generate and send, based on streams of vehicle data, deployment plans for deploying a vehicle software application, according to some embodiments.

In some embodiments, a vehicle software deployment management system 100 may receive a request to deploy one or more vehicle applications 200. In some embodiments, the request 200 may be received by the fleet management 102 that tracks and manages one or more vehicles of a fleet of vehicles that the given application may be deployed to. The request may indicate the vehicle(s) to deploy the one or more application to, including a virtual vehicle generated by a vehicle simulator 510 of the vehicle software deployment management system 100 or vehicles to be used as test environments. For example, the fleet management 102 of the vehicle software deployment management system 100 may test deployment of the application on a fleet of vehicles 521 that are specifically marked as test environments by sending a deployment plan and vehicle application to the test fleet. For example, based on the request 200, the fleet management may request the deployment plan generator 104 to generate one or more deployment plans for the selected vehicles. Thus, as illustrated in FIG. 5, the deployment plan generator 104 may transmit the deployment plan and vehicle application 506 to the vehicle 142. In some embodiments, the deployment plan and/or the vehicle application may be transmitted as signed serialized data chunks as discussed in FIG. 2.

The vehicle 142, in some embodiments, may generate and send ECU configuration and vehicle diagnostic data streams to the deployment plan generator 104. The deployment plan generator 104 may determine that a more optimal vehicle application configuration is available, and may dynamically generate, based on streams of vehicle data, deployment plans for deploying a vehicle software application, according to some embodiments. The data stream 508 may include the vehicle data as discussed in FIG. 4 and ECU status discussed in FIG. 3. The deployment plan generator 104 may determine that a threshold level of improvement in application reliability, processing efficiency, processing speed, and/or another optimization criteria of the vehicle 142 is available. Subsequent to determination that a threshold level of improvement of the vehicle 142 is met, the deployment plan generator 104 may generate and send an updated deployment plan and vehicle application based on the vehicle data stream 514. For example, the deployment plan generator 104 may determine that based on a vehicle diagnostic data that a portion of the vehicle communications bus is not available and send an updated deployment plan that re-deploys the vehicle application to another ECU. In some embodiments, prior to sending the updated deployment plan and vehicle application, the deployment plan generator 104 may request certification of the deployment plan 513. For example, the deployment plan generator 104 may send a request that includes the deployment plan, vehicle application, application dependencies, vehicle metadata, and/or application test results to a certification destination, and the certification destination may initiate its own separate internal certification workflow to determine whether the deployment plan should be certified and allowed to be deployed. In some embodiments, the certification destination may reject the deployment plan and request the deployment plan generator 104 to generate another deployment plan having a different application deployment sequence or configuration, such that certification can be met.

In some embodiments, the deployment plan generator 104 may perform dependency tracking/verification in order to determine whether the deployment plan is certified to be deployed to the vehicle. For example, vehicle applications may be deployed as groups where there exists certain interdependencies between the applications (and/or components of the applications) in the group. The deployment plan generator 104 may generate one or more dependency graphs that track changes made to the applications deployed in the vehicle. The dependency graph may track the effects of various changes to the dependencies as the applications are replaced, upgraded, or removed over time. The deployment plan generator 104 may also track and/or ensure that such changes do not violate conditions upon which certification relied for already installed vehicle software applications. Also, prior to deployment of a new vehicle software application, the deployment plan generator 104 may use the dependency graph to verify that the deployment based on the deployment plan will not negatively affect the listed dependencies or otherwise violate a condition upon which certification relies. In this way, deployment of the application may be cleared with regard to certification based on a determination that the deployment will not break any of the listed dependencies from the dependency graph. A certification process that involves dependency tracking/verification may prevent potential breakage of various dependencies and prevent application deployment failure before it occurs in the vehicle.

In some embodiments, the application may be obtained from the vehicle application storage 106 and/or external vehicle application storage 206 as discussed in FIG. 2. In some embodiments, the request to deploy vehicle application 200 may be indicated to the vehicle application marketplace 108. The request to deploy 200 may be based on a catalog of applications that are marked available for a particular vehicle model or a particular vehicle configuration. For example, the vehicle application marketplace 108 may indicate to a client or a customer of the vehicle software deployment management system 100 a list of applications that are available to be deployed. In some embodiments, subsequent to selection of an application from the list of applications, the vehicle application marketplace may obtain feasible deployment options 520 from the deployment plan generator. For example, the deployment plan generator 104 may obtain various deployment options that meet various ones of optimization criteria (e.g., application reliability, processing efficiency, and processing speed). The vehicle application marketplace 108 may request selection of feasible deployment option 522 to the client and/or customers.

In some embodiments, the request to select feasible deployment option 522 may be sent to the client that sent the request to deploy the vehicle application 200 to the vehicle software deployment management system 100. In some embodiments, the deployment plan generator 104 may determine that no feasible vehicle software applications are able to be deployed in the vehicle. In some embodiments, the feasible deployment plan option may include the one or more feasible deployment options that includes an option to change one or more of: an arrangement of vehicle software deployed in the vehicle, a collection of vehicle software deployed in the vehicle, and/or a specification of a vehicle hardware component.

In some embodiments, a vehicle simulator 510 may create a vehicle replica 512 based on the vehicle 142 information obtained by the deployment plan generator 104. The vehicle simulator 510 and the vehicle replica generated may be used to test deployment of vehicle application 520. In some embodiments, the testing of deployment of the application using a deployment plan may be based on the initial request to deploy vehicle application 200. Although FIG. 5 illustrates one updated deployment plan sent to the vehicle 142, there may be any number of dynamic updates to the deployment plan sent to the vehicle 142 based on the ECU configuration and vehicle diagnostic data streams obtained.

Figure 6A:
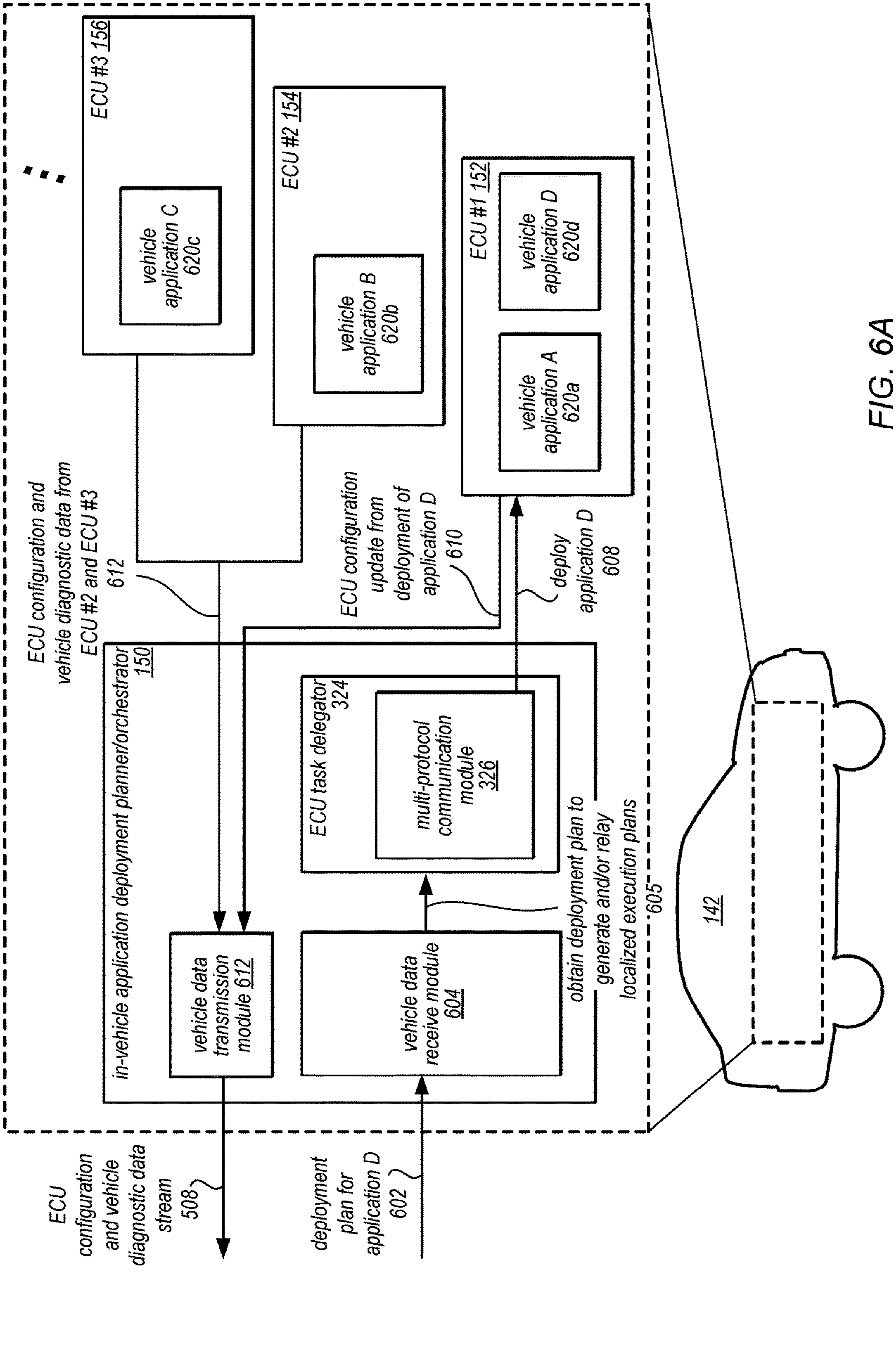
FIG. 6A illustrates a more detailed view of an in-vehicle application deployment planner/orchestrator of a vehicle that uses a deployment plan received from a vehicle software deployment management system to deploy a vehicle application, wherein the in-vehicle application deployment planner/orchestrator also sends a stream of ECU configuration and vehicle diagnostic data from ECUs of the vehicle back to the vehicle software deployment management system for use in dynamically updating a deployment plan for deploying in-vehicle applications on the vehicle, according to some embodiments.

FIG. 6A illustrates a more detailed view of an in-vehicle application deployment planner/orchestrator of a vehicle that uses deployment plan received from a vehicle software deployment management system to deploy a vehicle application, wherein the in-vehicle application deployment planner/orchestrator also sends a stream of ECU configuration and vehicle diagnostic data from ECUs of the vehicle back to the vehicle software deployment management system for use in dynamically updating the deployment plan for the vehicle, according to some embodiments. In some embodiments, a deployment plan for an application, such as application D 602 may be received by a vehicle data receive module 604 that receives the deployment plan and the required application packages. In some embodiments, the application received may be application images in OCI image format and the vehicle data receive module 604 may be an over-the-air (OTA) agent that receives the deployment plan for application D wirelessly. In some embodiments, the vehicle data receive module 604 may be similar to the in-vehicle receive module 312 as discussed in FIG. 3.

Subsequent to receiving the deployment plan for application D, the ECU task delegator may obtain the deployment plan to generate and/or relay localized execution plans 605. In some embodiments, the deployment plan may contain all of the relevant localized instructions and/or execution plans for the in-vehicle deployment planner/orchestrator 150 to relay to relevant vehicle components (such as ECUs) in order to deploy the vehicle software application. In some embodiments, the relaying of the localized execution plans may not be restricted to unmodified transmission of the localized execution plans generated by the deployment plan generator 104, but may also include making modifications to the localized execution plans including reassembling, decompressing, reformatting of the localized execution plans, etc. In some embodiments, the in-vehicle deployment planner/orchestrator 150 may receive a partial deployment plan containing localized execution plans for a portion of the vehicle software application and localized execution plans for a remaining portion of the vehicle software application may be generated by the in-vehicle deployment planner/orchestrator 150 as discussed in FIGS. 3-5. The multi multi-protocol communication module 326 may deploy application D 608 to the ECU #1 (152) such that ECU #1 (152) has vehicle application A 620*a* and vehicle application D 620*d* deployed. The deployment may occur via one or more vehicle communication buses using one or more communication protocols as discussed in FIG. 3. The various ECUs may furthermore contain various vehicle applications currently deployed, such as vehicle application B 620*b* in ECU #2 (154) and vehicle application C 620*c* in ECU #3 (156). Upon successful deployment of vehicle application D 620*d*, ECU #1 may send an ECU configuration from deployment of application D 610 to the vehicle data transmission module 612. In some embodiments, the vehicle data transmission module 612 may be similar to the in-vehicle transmit module 314 as discussed in FIG. 3 and/or may be a transmission module able to communicate with the vehicle software deployment management system 100 via a plurality of communication protocols as discussed in FIG. 2.

In addition to the ECU configuration from deployment of application D 610, in some embodiments, the vehicle data transmission module 612 may receive ECU configuration and vehicle diagnostic data from ECU #2 and ECU #3 612 and may send the data to vehicle software deployment management system 100 as data stream 508. As discussed in FIG. 5, based on the data stream 508 and subsequent to determination that a threshold optimization of the vehicle 142 is met, an updated deployment plan may be generated and sent to the vehicle that may further result in a redeployment of application D.

Figure 6B:
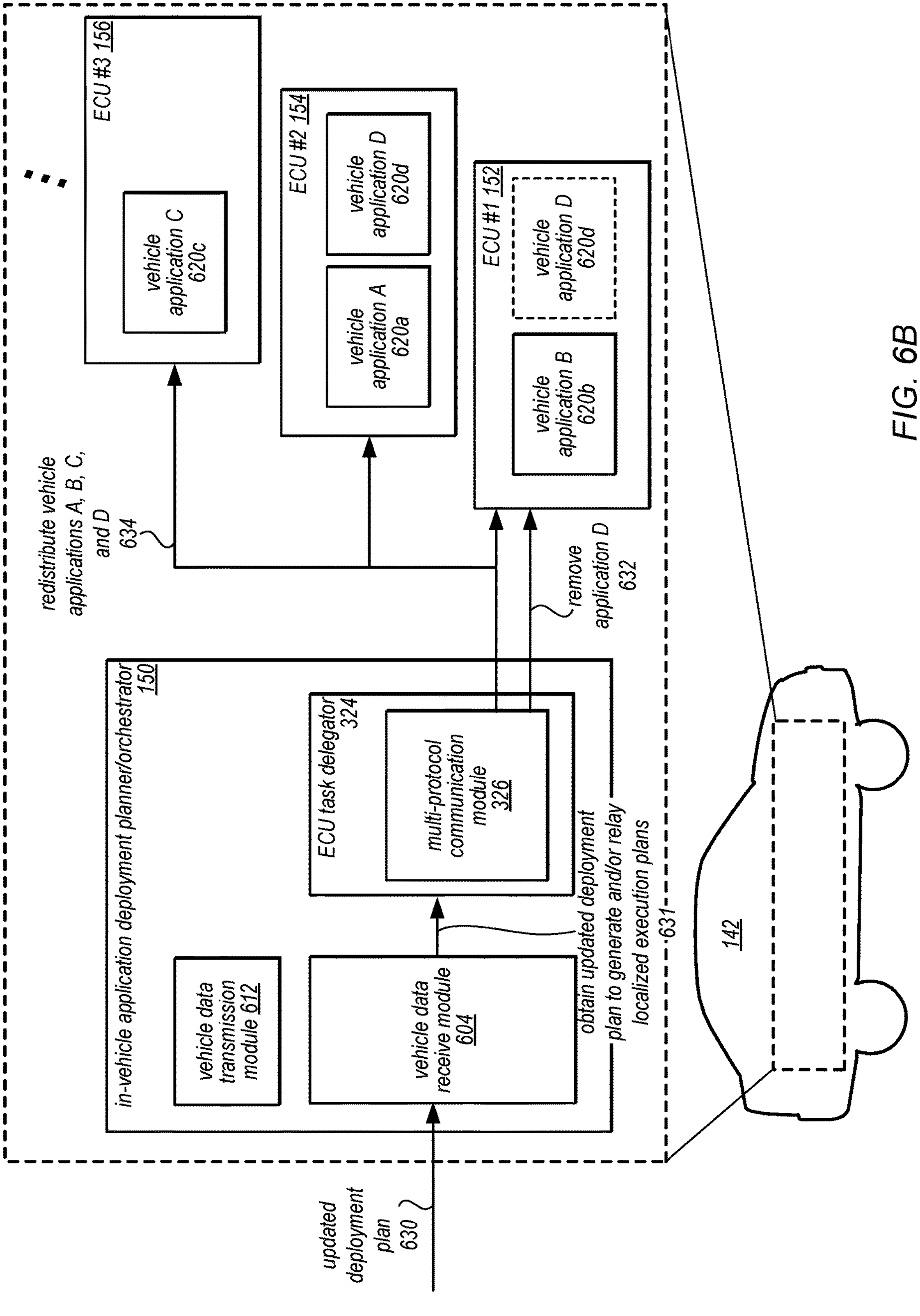
FIG. 6B illustrates a more detailed view of an in-vehicle application deployment planner/orchestrator of a vehicle that redeploys vehicle applications implemented using various ECUs based on an updated deployment plan from the vehicle software deployment management system, according to some embodiments.

FIG. 6B illustrates a more detailed view of an in-vehicle application deployment planner/orchestrator of a vehicle that redeploys vehicle applications in various ECUs based on an updated deployment plan from the vehicle software deployment management system, according to some embodiments. In some embodiments, the vehicle data receive module 604 may receive an updated deployment plan 630. The vehicle software deployment management system 100 may receive the data stream 508 and dynamically generate the updated deployment plan 630. The ECU task delegator 324 may obtain the updated deployment plan to generate and/or relay localized execution plans 631.

In some embodiments, the localized execution plans may include one or more operations to remove application D 632 from ECU #1. The localized execution plan may furthermore include plans to redeploy not only application D 620 to ECU #2 as illustrated, but may include multiple respective localized execution plans for the respective ECUs to redistribute vehicle application A, B, C, and D 634. For example, the updated deployment plan may redeploy previously deployed vehicle application B from ECU #2 154 to ECU #1 152. In some embodiments, the various vehicle applications A 620*a*, B 620*b*, C 620*c*, and D 620*d*, may be subcomponents of a distributed vehicle software application and may be redistributed according to the updated deployment plan.

Figure 7:
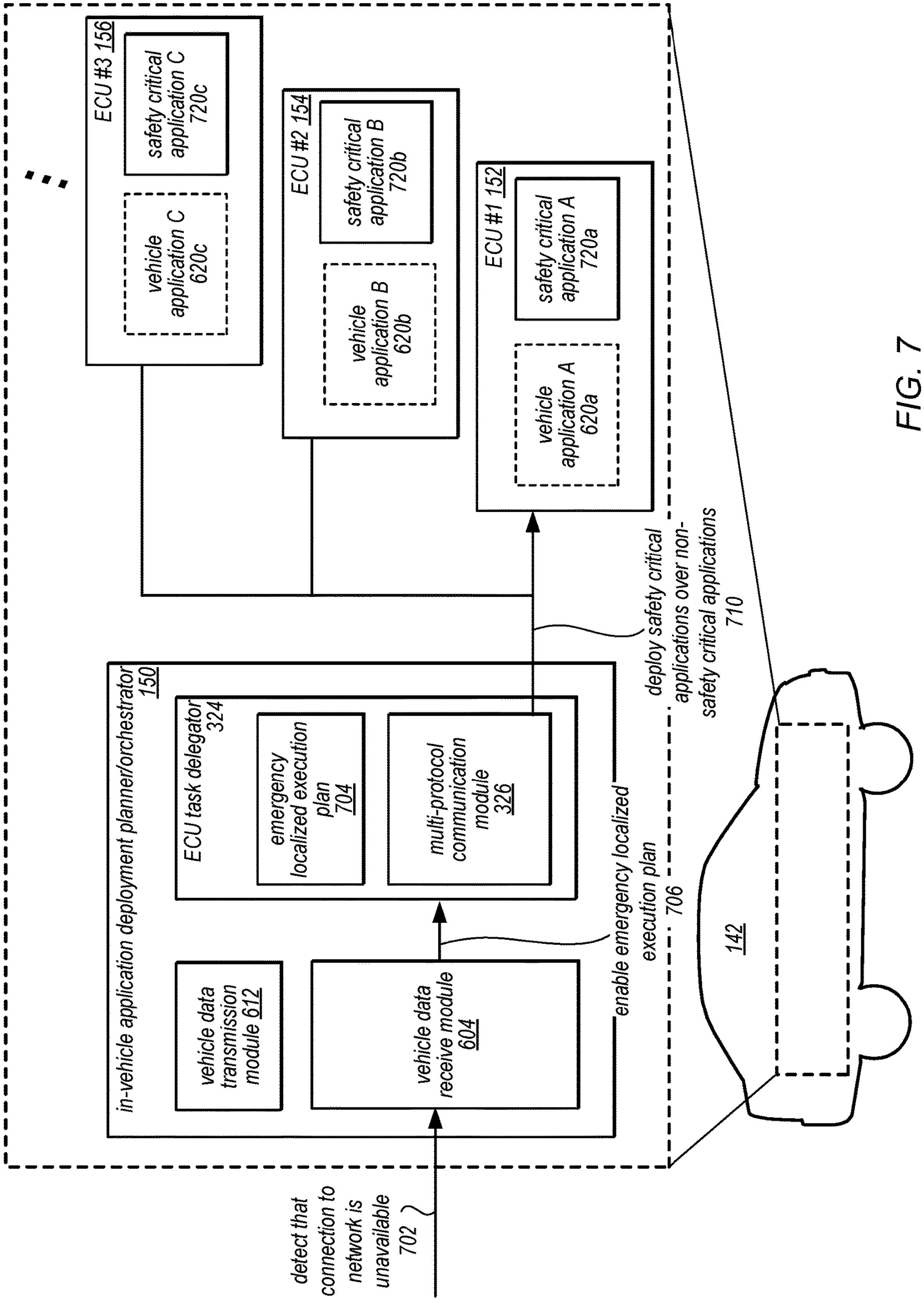
FIG. 7 illustrates a more detailed view of an in-vehicle application deployment planner/orchestrator of a vehicle that uses an alternative localized execution plan that prioritizes availability of safety critical applications over non-safety critical applications, according to some embodiments.

FIG. 7 illustrates a more detailed view of an in-vehicle application deployment planner/orchestrator of a vehicle that uses an alternative localized execution plan that prioritizes availability of safety critical applications over non-safety critical applications, according to some embodiments. In some embodiments, the vehicle data receive module 604 may detect that connection to the network is unavailable 702. For example, the vehicle data receive module 604 may determine that one or more of the wireless networks that the vehicle uses to receive data, such as a cellular network, Wi-Fi network or other wireless network is not available. Subsequent to the detection 702, the ECU task delegator 324 may enable a localized execution plan 706 to be used while the network connection is unavailable. In some embodiments, instead of detecting that the connection to the network is unavailable, the vehicle data receive module 604 may detect that connection to the vehicle software deployment management system 100 is not available or that the communication quality or speed has degraded beyond a threshold level.

In some embodiments, the ECU task delegator 324 may contain emergency localized execution plan 704 and may generate an additional localized execution plan that deploys safety critical application over non-safety critical applications 710. The emergency localized execution plan 704 may be a part of the ECU task delegator 324 or may be received from the vehicle software deployment management system 100. For example, in the illustrated vehicle 142, the safety critical applications A 720*a*, applications B 720*b*, and applications C 720*c* may be deployed in ECU #1 152, ECU #2 154, and ECU #3 156 respectively over the original vehicle applications A 620*a*, B 620*d*, and C 620*c*. In some embodiments, safety-critical applications may include features that impact passenger safety (such as airbag deployment application) and/or critical vehicle performance features (such as brake control application). In some embodiments, non-safety critical applications may include various infotainment applications and/or fuel efficiency applications. The emergency localized execution plan may include prior determination as to which applications are considered safety-critical and/or non-safety critical.

Figure 8:
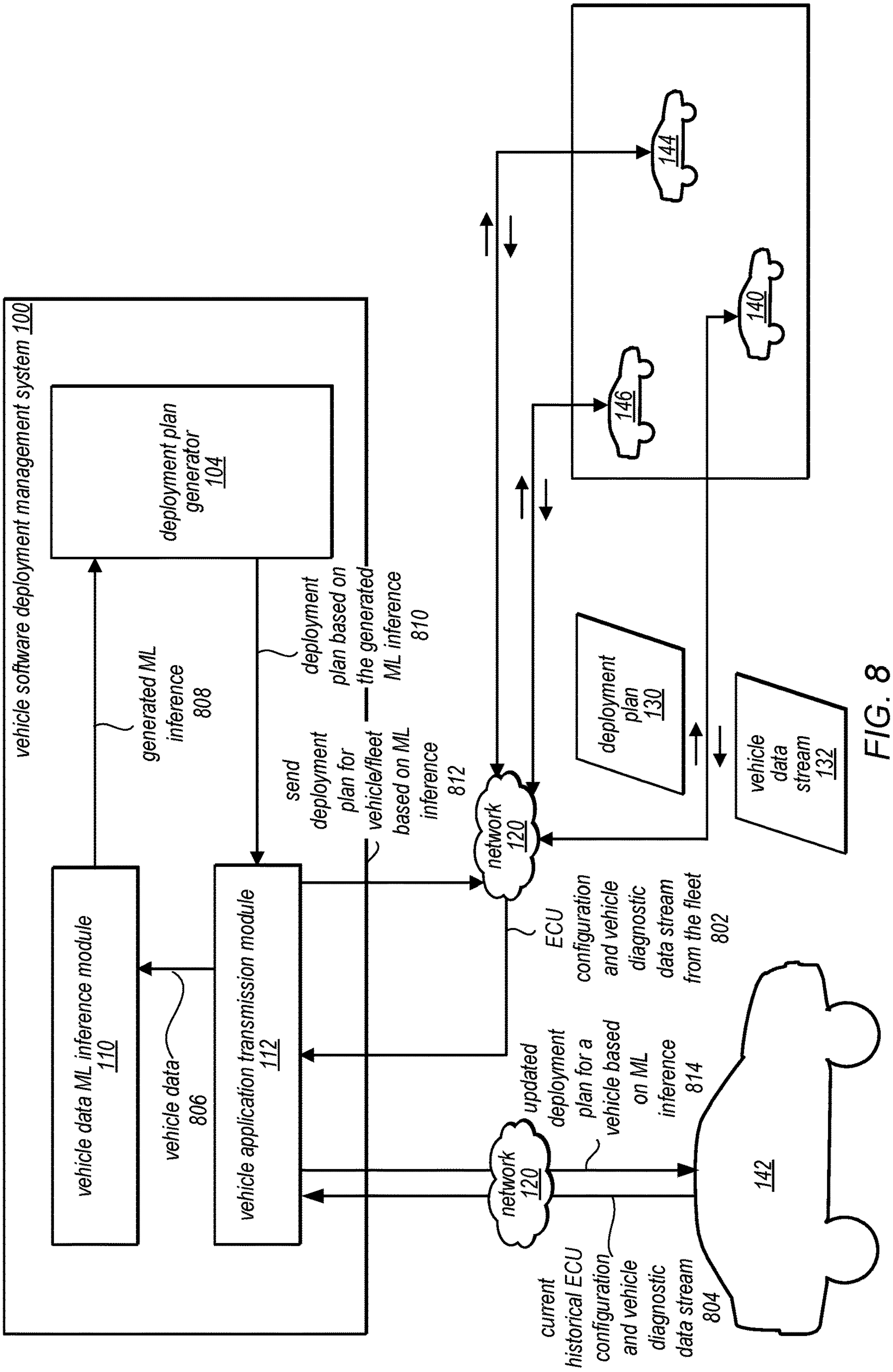
FIG. 8 illustrates a vehicle software deployment management system configured to dynamically generate deployment plans for vehicle applications based on various vehicle/vehicle fleet data streams and machine learning (ML) models, according to some embodiments.

FIG. 8 illustrates a vehicle software deployment management system dynamically generating deployment plan for vehicle applications based on various vehicle/vehicle fleet data streams and machine learning (ML) models, according to some embodiments. In some embodiments, ECU configuration and vehicle diagnostic data stream from the fleet of vehicles 802 may be sent over the network 120 to the vehicle application transmission module 112. Subsequent to receiving the data stream from the fleet 802, the vehicle application transmission module 112 may send vehicle data 806 to the vehicle data ML inference module 110 that generates ML inferences 808. The generated ML inferences 808 may be used by the deployment plan generator 104 to determine the optimal application deployment configuration and generate deployment plans.

In some embodiments, using the vehicle data 806 from the fleet, the vehicle data ML inference module may train one or more ML models to generate one or more ML inferences. For example, based on the vehicle data 806, the trained ML model may make an inference indicating a negative impact of deployment of a particular application to a particular ECU environment. The deployment plan generator 104 may use the ML inference to generate and send a deployment plan based, at least in part, on the generated ML inference 810. The vehicle application transmission module 112 may send the deployment plan for the vehicle/fleet based on the ML inference 812 as discussed in FIGS. 5-6. In some embodiments, the vehicle data ML inference module 110 may train the one or more ML models based on current and historical updates to the ECU configuration and diagnostic data of the vehicle 804 sent from the vehicle 142. The vehicle application transmission module 112 may send an updated deployment plan for the vehicle 814 based on the ML inference obtained from the ML model using the current and historical updates to the ECU configuration and diagnostic data of the vehicle 804.

Figure 9:
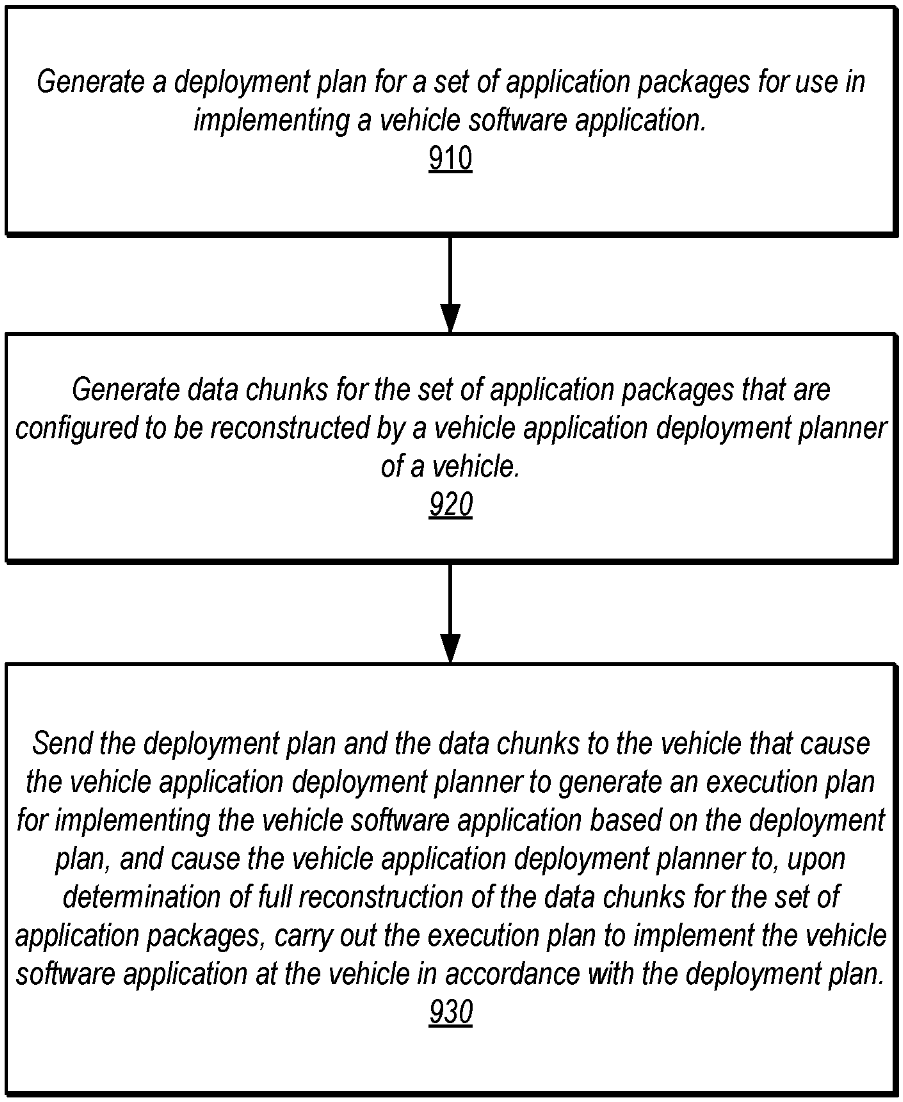
FIG. 9 illustrates a flowchart of operations performed by a vehicle software deployment management system to send signed serialized data chunks of a vehicle software application and/or a deployment plan for the software application to vehicles using a protocol agnostic transmission format, according to some embodiments.

FIG. 9 illustrates a flowchart of operations performed by a vehicle software deployment management system to send signed serialized data chunks of a vehicle software application images and/or a deployment plan for the software application to vehicles using a protocol agnostic transmission format, according to some embodiments.

At block 910, a vehicle application deployment planner generates a deployment plan for a set of application packages for use in implementing a vehicle software application. In some embodiments, the application packages may be container images that are obtained from an external image repository as discussed in FIG. 2. In some embodiments, the application packages may be container images according to an Open Container Image (OCI) format.

At block 920, the vehicle application deployment planner generates data chunks for the set of application packages that are configured to be reconstructed by a vehicle application deployment planner of a vehicle. In some embodiments, the data chunks may be stored in a first in first out (FIFO) type queue in the vehicle application deployment planner as discussed in FIGS. 1 and 2. However, in some embodiments, other queue sequencing may be used.

At block 930, the vehicle application deployment planner sends the deployment plan and the data chunks to the vehicle. The deployment plan causes the vehicle application deployment planner to generate an execution plan for implementing the vehicle software application based on the deployment plan, and causes the vehicle application deployment planner to, upon determination of full reconstruction of the data chunks for the set of application packages, carry out the execution plan to implement the vehicle software application at the vehicle in accordance with the deployment plan.

Figure 10:
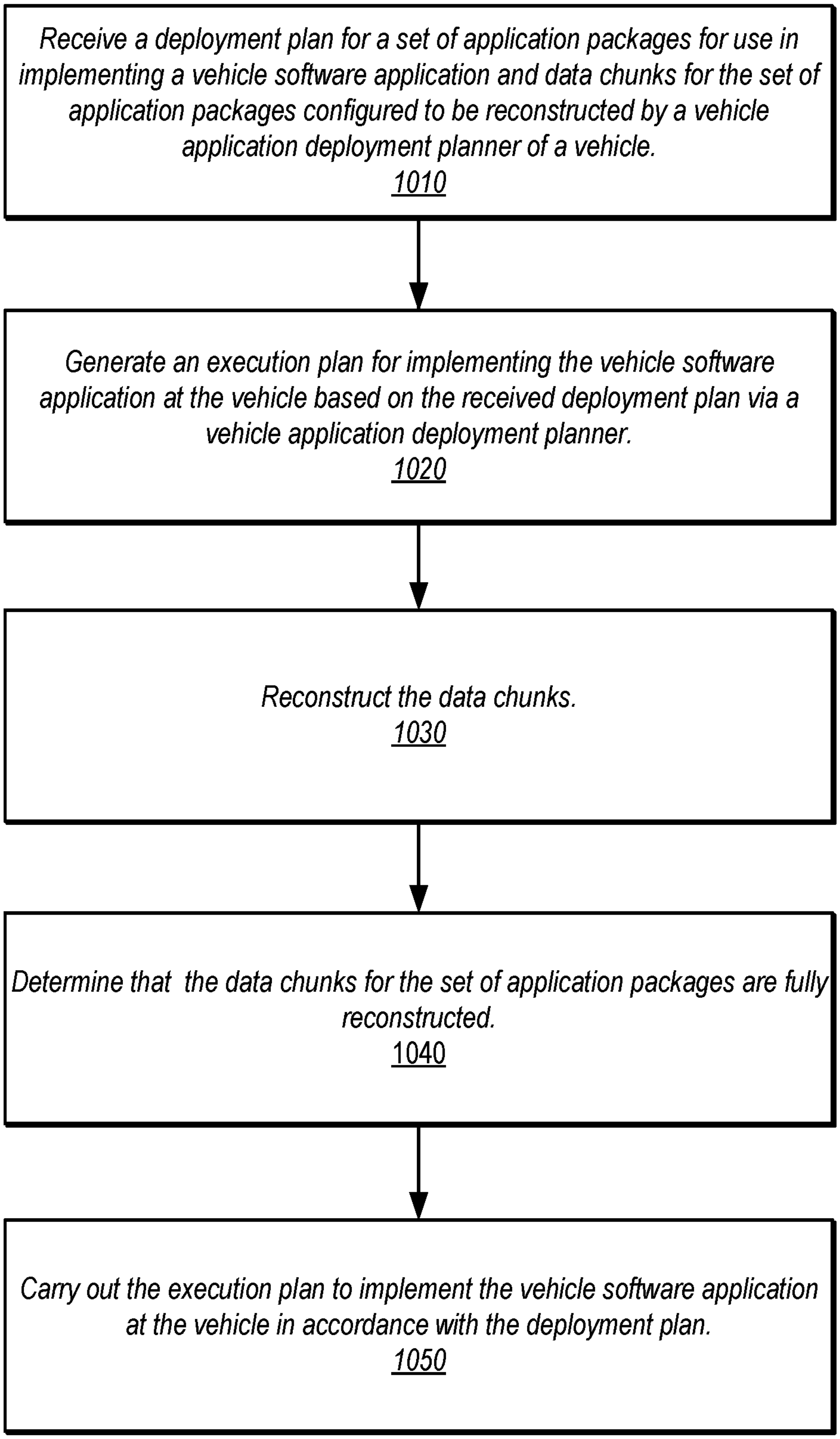
FIG. 10 illustrates a flowchart of operations performed by an in-vehicle application deployment planner/orchestrator of a vehicle to carry out an execution plan to implement a vehicle software application, wherein the execution plan is generated by the in-vehicle application deployment planner/orchestrator based on a received deployment plan for the in-vehicle application, according to some embodiments.

FIG. 10 illustrates a flowchart of operations performed by an in-vehicle application deployment planner/orchestrator of a vehicle to carry out execution of a plan to implement a vehicle software application, wherein the execution plan is generated by the in-vehicle application deployment planner/orchestrator based on a received deployment plan for the in-vehicle application, according to some embodiments.

At block 1010, an in-vehicle application deployment planner/orchestrator receives a deployment plan for a set of application packages for use in implementing a vehicle software application and also receives data chunks for the set of application packages configured to be reconstructed by a vehicle application deployment planner of a vehicle. In some embodiments, data chunks may be received in a protocol agnostic transmission format that is compatible with different transmission protocols as discussed in FIGS. 1 and 2.

At block 1020, the in-vehicle application deployment planner/orchestrator generates an execution plan for implementing the vehicle software application at the vehicle based on the received deployment plan via a vehicle application deployment planner.

At block 1030, the in-vehicle application deployment planner/orchestrator reconstructs the data chunks. In some embodiments, the data chunks may be queued in a package manager 322 as discussed in FIG. 3.

At block 1040, the in-vehicle application deployment planner/orchestrator determines that the set of application packages are fully reconstructed from the received data chunks.

At block 1050, the in-vehicle application deployment planner/orchestrator carries out the execution plan to implement the vehicle software application at the vehicle in accordance with the deployment plan.

Figure 11:
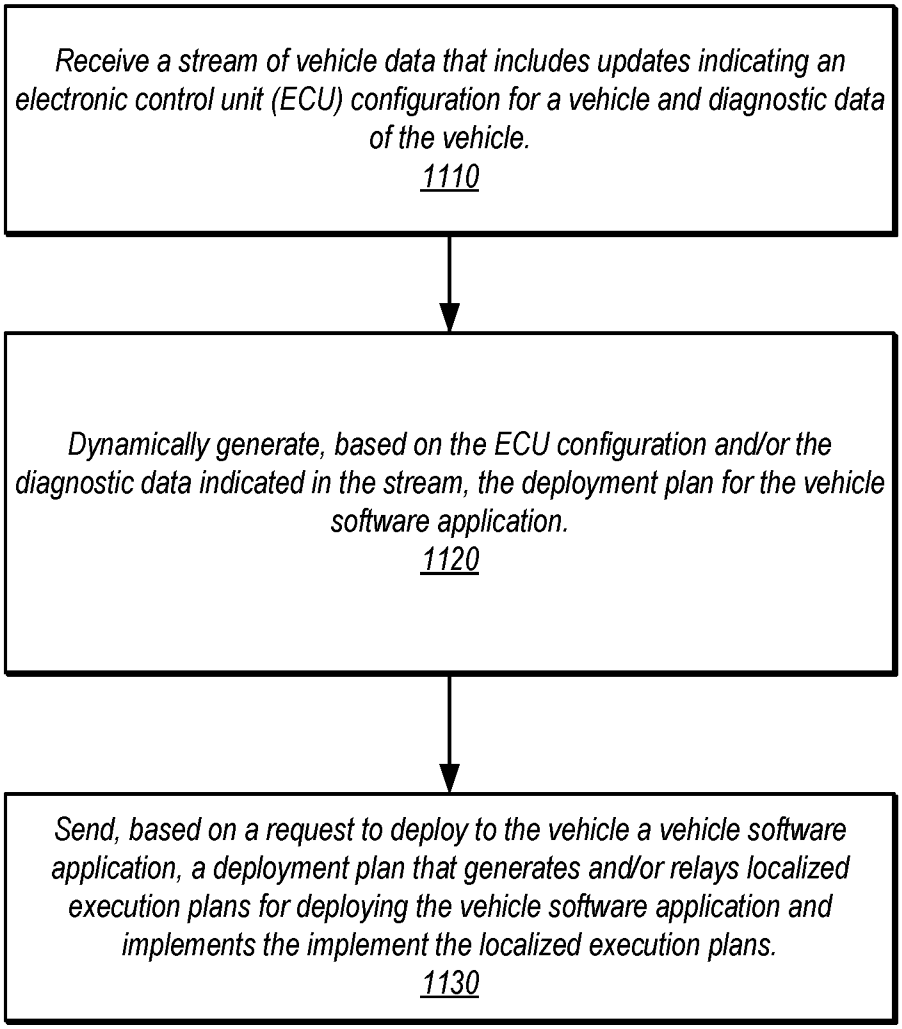
FIG. 11 illustrates a flowchart of operations performed by a vehicle software deployment management system to dynamically generate and send, based on streams of vehicle data, deployment plans for deploying a vehicle software application, according to some embodiments.

FIG. 11 illustrates a flowchart of operations performed by a vehicle software deployment management system to dynamically generate and send, based on streams of vehicle data, deployment plans for deploying the vehicle software application, according to some embodiments.

At block 1110, a vehicle application deployment planner receives a stream of vehicle data that includes updates indicating an electronic control unit (ECU) configuration for a vehicle and/or diagnostic data of the vehicle. In some embodiments, vehicle data received may include one or more of a capacity of compute resources of the ECU, types of containers the ECU supports, configurations of other applications deployed to the ECU as discussed in FIG. 4.

At block 1120, the vehicle application deployment planner dynamically generates, based on the ECU configuration and/or the diagnostic data indicated in the stream, the deployment plan for the vehicle software application.

At block 1130, the vehicle application deployment planner sends, based on a request to deploy to the vehicle a vehicle software application, a deployment plan that generates and/or relays localized execution plans for deploying the vehicle software application and implements the localized execution plans. In some embodiments, the deployment plan may be sent based on receiving a certification from a certification destination that performs a certification workflow as discussed in FIG. 5

Figure 12:
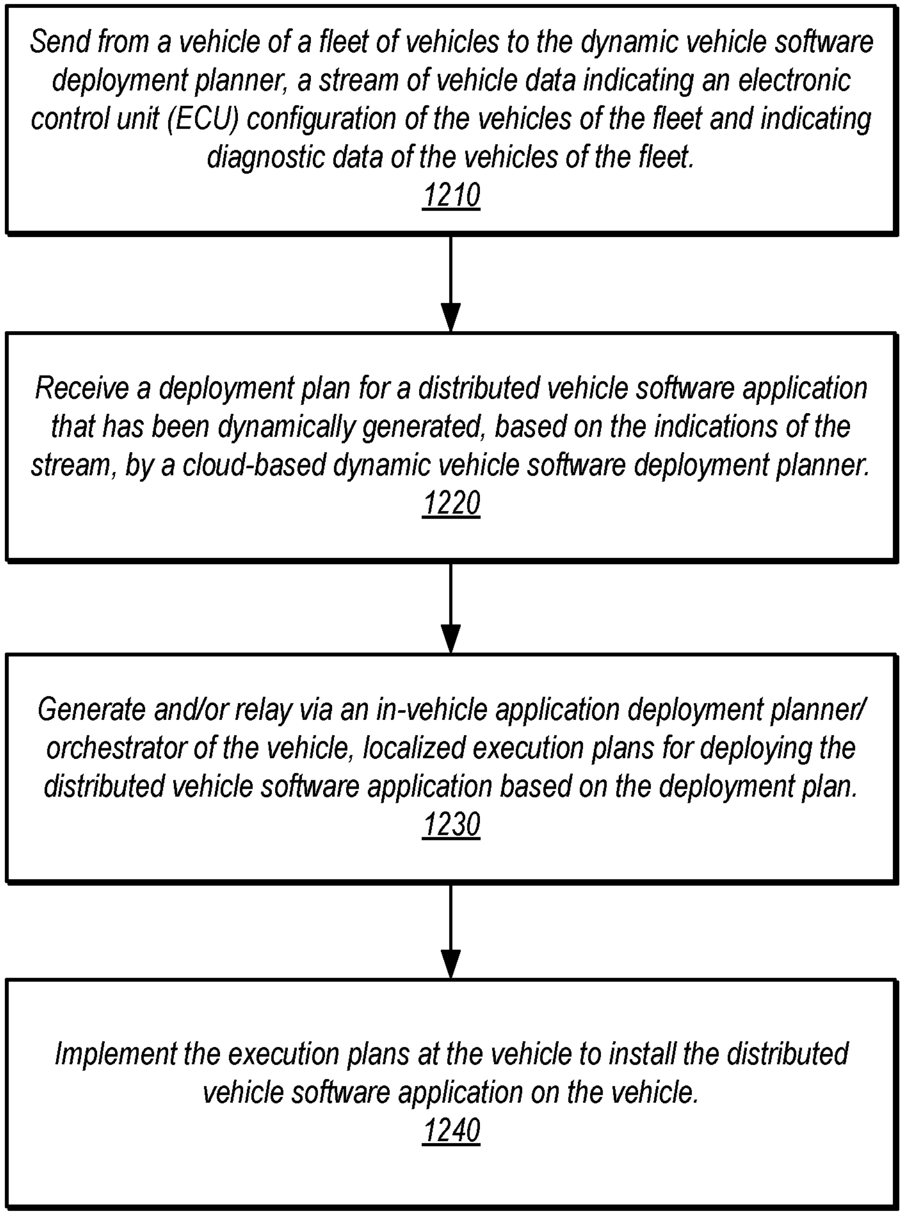
FIG. 12 illustrates a flowchart of operations performed by an in-vehicle application deployment planner/orchestrator of a vehicle to carry out an execution plan to implement a vehicle software application according to a dynamically generated deployment plan received by the in-vehicle application deployment planner/orchestrator, according to some embodiments.

FIG. 12 illustrates a flowchart of operations performed by an in-vehicle application deployment planner/orchestrator of a vehicle to carry out an execution plan to implement a vehicle software application according to a dynamically generated deployment plan received by an in-vehicle application deployment planner/orchestrator, according to some embodiments.

At block 1210, an in-vehicle application deployment planner/orchestrator sends from a vehicle of a fleet of vehicles to the dynamic vehicle software deployment planner, a stream of vehicle data indicating an electronic control unit (ECU) configuration of the vehicles of the fleet and/or indicating diagnostic data of the vehicles of the fleet.

At block 1220, the in-vehicle application deployment planner/orchestrator receives a deployment plan for a distributed vehicle software application that has been dynamically generated, based on the indications of the stream, by a cloud-based dynamic vehicle software deployment planner. In some embodiments, the deployment plan received by the in-vehicle application deployment planner/orchestrator may be a deployment plan that was optimized for the vehicle based on historical data of the vehicle and/or a fleet of vehicles, as discussed in FIG. 5 and FIG. 8.

At block 1230, the in-vehicle application deployment planner/orchestrator generates and/or relays localized execution plans for deploying the distributed vehicle software application based on the deployment plan. In some embodiments, the localized execution plans may be relayed only to the appropriate ECUs instead of being transmitted to all ECUs of the vehicle as discussed in FIG. 3.

At block 1240, the in-vehicle application deployment planner/orchestrator implements the execution plans at the vehicle to install the distributed vehicle software application on the vehicle.

Example Computer System

Figure 13:
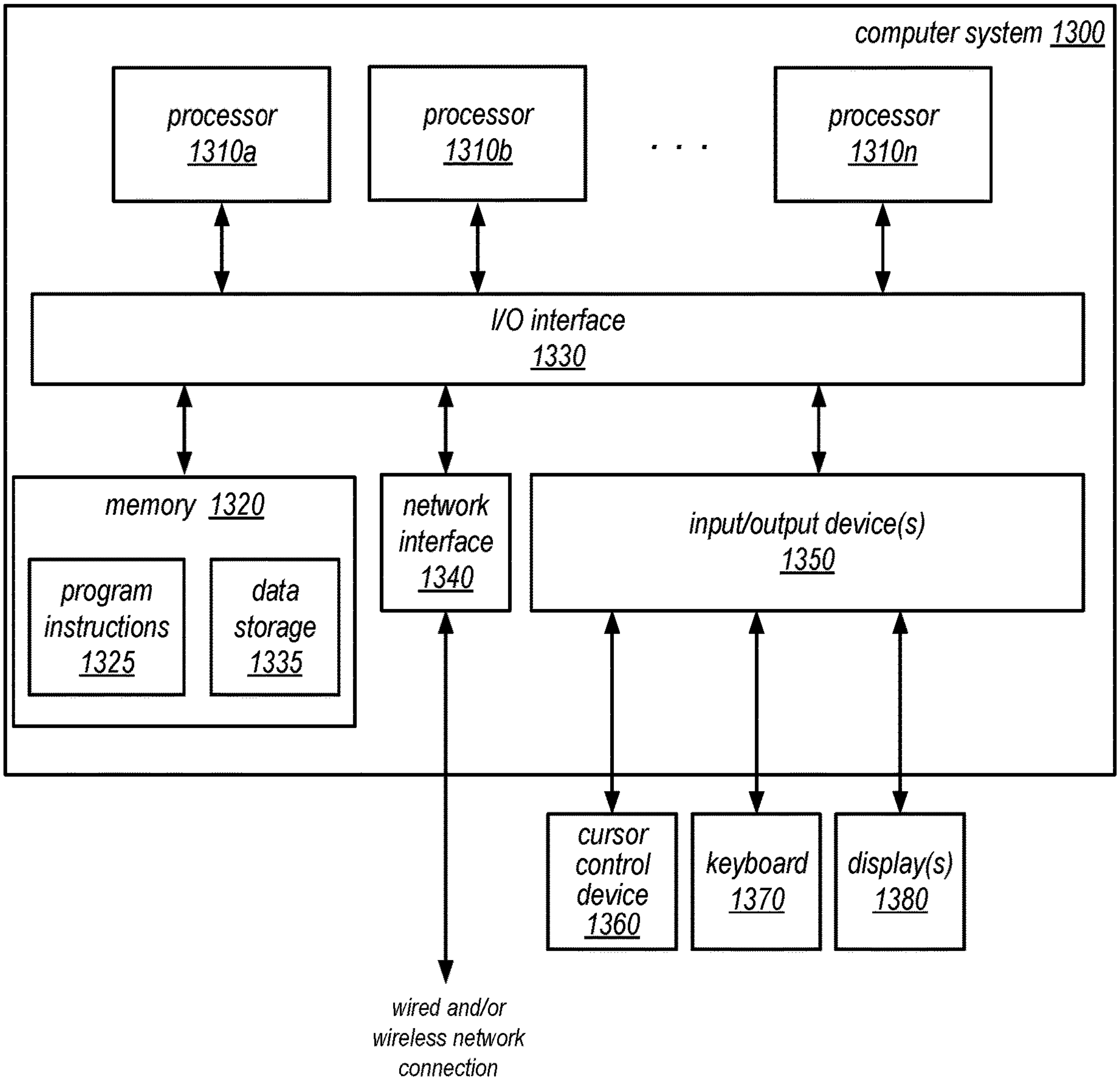
FIG. 13 illustrates a block diagram illustrating an example computer system that implements some or all of the techniques described herein, according to some embodiments.

Any of various computer systems may be configured to implement processes associated with a vehicle software deployment management system, in-vehicle application deployment planner/orchestrator, an operating system in a vehicle or device, or any other component of the above figures. For example, FIG. 13 illustrates a block diagram illustrating an example computer system that implements some or all of the techniques described herein, according to some embodiments. In various embodiments, the vehicle software deployment management system, the provider network that implement the vehicle software deployment management system and other cloud services, the operating system in a vehicle or device, or any other component of the above figures FIGS. 1-12 may each include one or more computer systems 1300 such as that illustrated in FIG. 13.

In the illustrated embodiment, computer system 1300 includes one or more processors 1310 coupled to a system memory 1320 via an input/output (I/O) interface 1330. Computer system 1300 further includes a network interface 1340 coupled to I/O interface 1330. In some embodiments, computer system 1300 may be illustrative of servers implementing enterprise logic or that provide a downloadable application, while in other embodiments servers may include more, fewer, or different elements than computer system 1300.

In various embodiments, computing device 1300 may be a uniprocessor system including one processor or a multiprocessor system including several processors 1310*a*-1310*n* (e.g., two, four, eight, or another suitable number). Processors 1310*a*-1310*n* may include any suitable processors capable of executing instructions. For example, in various embodiments, processors 1310*a*-1310*n* may be processors implementing any of a variety of instruction set formats (ISAs), such as the x86, PowerPC, SPARC, or MIPS ISAs, or any other suitable ISA. In some embodiments, processors 1310*a*-1310*n* may include specialized processors such as graphics processing units (GPUs), application specific integrated circuits (ASICs), etc. In multiprocessor systems, each of processors 1310*a*-1310*n* may commonly, but not necessarily, implement the same ISA.

System memory 1320 may be configured to store program instructions and data accessible by processor(s) 1310*a*-1310*n*. In various embodiments, system memory 1320 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 1320 as code (e.g., program instructions) 1325 and data storage 1335.

In one embodiment, I/O interface 1330 may be configured to coordinate I/O traffic between processors 1310*a*-1310*n*, system memory 1320, and any peripheral devices in the device, including network interface 1340 or other peripheral interfaces. In some embodiments, I/O interface 1330 may perform any necessary protocol, timing, or other data transformations to convert data signals from one component (e.g., system memory 1320) into a format suitable for use by another component (e.g., processor 1310). In some embodiments, I/O interface 1330 may include support for devices attached through various types of peripheral buses, such as a variant of the Peripheral Component Interconnect (PCI) bus standard or the Universal Serial Bus (USB) standard, for example. In some embodiments, I/O interface 1330 may include support for devices attached via an automotive CAN bus, etc. In some embodiments, the function of I/O interface 1330 may be split into two or more separate components, such as a north bridge and a south bridge, for example. Also, in some embodiments some or all of the functionality of I/O interface 1330, such as an interface to system memory 1320, may be incorporated directly into processors 1310*a*-1310*n*.

In some embodiments, the network interface 1340 may be coupled to I/O interface 1330, and one or more input/output devices 1350, such as cursor control device 1360, keyboard 1370, and display(s) 1380. In some cases, it is contemplated that embodiments may be implemented using a single instance of computer system 1300, while in other embodiments multiple such computer systems, or multiple nodes making up computer system 1300, may be configured to host different portions or instances program instructions as described above for various embodiments. For example, in one embodiment some elements of the program instructions may be implemented via one or more nodes of computer system 1300 that are distinct from those nodes implementing other elements.

Network interface 1340 may be configured to allow data to be exchanged between computing device 1300 and other devices associated with a network or networks. In various embodiments, network interface 1340 may support communication via any suitable wired or wireless general data networks, such as types of Ethernet networks, cellular networks, Bluetooth networks, Wi-Fi networks, Ultra-wideband Networks, for example. Additionally, network interface 1340 may support communication via telecommunications/telephony networks such as analog voice networks or digital fiber communications networks, via storage area networks such as Fibre Channel SANs, or via any other suitable type of network and/or protocol.

In some embodiments, system memory 1320 may be one embodiment of a computer-readable (e.g., computer-accessible) medium configured to store program instructions and data as described above for implementing embodiments of the corresponding methods, systems, and apparatus. However, in other embodiments, program instructions and/or data may be received, sent, or stored upon different types of computer-readable media. Generally speaking, a computer-readable medium may include non-transitory storage media or memory media such as magnetic or optical media, e.g., disk or DVD/CD coupled to computing device 1300 via I/O interface 1330. One or more non-transitory computer-readable storage media may also include any volatile or non-volatile media such as RAM (e.g., SDRAM, DDR SDRAM, RDRAM, SRAM, etc.), ROM, etc., that may be included in some embodiments of computing device 1300 as system memory 1320 or another type of memory. Further, a computer-readable medium may include transmission media or signals such as electrical, electromagnetic, or digital signals, conveyed via a communication medium such as a network and/or a wireless link, such as may be implemented via network interface 1340. Portions or all of multiple computing devices such as that illustrated in FIG. 13 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device" and "ECU" as used herein, refers to at least all these types of devices, and is not limited to these types of devices.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the data transfer tool, various services, databases, devices and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending, or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system, comprising:
- one or more computing devices configured to implement a dynamic vehicle software deployment planner configured to:
  - receive, from a vehicle of a fleet of vehicles, a stream of vehicle data comprising updates indicating:
    - an electronic control unit (ECU) configuration of the vehicle; and
    - diagnostic data for the vehicle or systems of the vehicle, wherein the diagnostic data comprises information indicating available capacity or performance of one or more electronic control units (ECUs);
  - generate, a deployment plan for deploying a distributed vehicle software application on the vehicle, wherein the deployment plan is generated based, at least in part, on the ECU configuration of the vehicle and the diagnostic data for the vehicle indicated in the stream, and wherein the deployment plan indicates destinations for deploying localized execution plans to the one or more ECUs, based on the available capacity or performance of the one or more ECUs, in which the respective ones of components of the distributed vehicle software application are to be deployed; and
  - send, based on a request received by the dynamic vehicle software deployment planner, the deployment plan,
  - wherein the generated deployment plan comprises instructions that, when executed, cause an in-vehicle application deployment planner of the vehicle to:
    - relay the localized execution plans to the one or more ECUs for deploying the components of the distributed vehicle software application based on the destinations indicated in the deployment plan; and
    - implement the localized execution plans to deploy, on the vehicle, the components of the distributed vehicle software application.

2. The system of claim 1, wherein the generated deployment plan comprises instructions that, when executed further cause the in-vehicle application deployment planner to:
- determine, based on software dependencies for the components of the distributed vehicle software application, an order in which the components are to be deployed to the one or more ECUs, wherein the deployment plan comprises one or more indications of software dependencies to be used to determine the order.

3. The system of claim 1, wherein the dynamic vehicle software deployment planner is further configured to:
- dynamically generate, based on the stream of vehicle data, an updated deployment plan for the distributed vehicle software application; and
- send the dynamically generated updated deployment plan to the vehicle, wherein the dynamically generated deployment plan comprises instructions that, when executed, cause the in-vehicle application deployment planner of the vehicle to:
  - deploy components of the distributed vehicle software application to one or more ECUs of the vehicle in a configuration indicated in the deployment plan that was generated taking into account a current ECU configuration and current diagnostic data for the vehicle indicated in the stream.

4. The system of claim 3, wherein the dynamic vehicle software deployment planner is further configured to:
- determine, based on the ECU configuration of the vehicle and the diagnostic data for the vehicle indicated in the stream, whether one or more conditions of the vehicle related to the deployment of the distributed vehicle software have changed by more than a threshold amount;
- in response to the one or more conditions having changed by more than the threshold amount:
  - perform the dynamic generation of the updated deployment plan and the sending of the updated deployment plan; and
- in response to the one or more conditions not having changed by more than the threshold amount:
  - refrain from performing the dynamic generation of the updated deployment plan and the sending of the updated deployment plan.

5. The system of claim 1, wherein the deployment plan is configured to interface with an in-vehicle orchestrator of the vehicle, wherein the in-vehicle orchestrator employs a deployment adapter framework configured to interface with a plurality of different runtime architectures of a plurality of ECUs of the vehicle.

6. A method, comprising:
- receiving, via a vehicle software deployment planner, a stream of vehicle data comprising updates indicating:
  - an electronic control unit (ECU) configuration for a vehicle; and
  - diagnostic data of the vehicle, wherein the diagnostic data comprises information indicating available capacity or performance of one or more electronic control units (ECUs); and
- sending, based on a request to deploy to the vehicle a vehicle software application, a deployment plan for the vehicle software application, wherein the deployment plan is generated based on the ECU configuration and the diagnostic data indicated in the stream, and wherein the deployment plan indicates destinations for deploying localized execution plans to the one or more ECUs, based on the available capacity or performance of the one or more ECUs, in which the respective ones of components of the vehicle software application are to be deployed,
- wherein the deployment plan comprises instructions that, when executed, cause an in-vehicle application deployment planner of the vehicle to:
  - relay the localized execution plans to the one or more ECUs for deploying the components of the vehicle software application based on the destinations indicated in the deployment plan; and implement, based on the deployment plan, the localized execution plans for deploying the vehicle software application at the vehicle.

7. The method of claim 6, wherein the deployment plan comprises instructions that, when executed further cause the in-vehicle application deployment planner to:

determine, based on software dependencies for the components of the vehicle software application, an order in which the components are to be deployed to the one or more ECUs, wherein the deployment plan comprises one or more indications of software dependencies to be used to determine the order.

8. The method of claim 6, further comprising:

dynamically generating, based on the ECU configuration and/or the diagnostic data indicated in the stream, the deployment plan for the vehicle software application; and sending the dynamically generated deployment plan to the vehicle, wherein the dynamically generated deployment plan comprises instructions that, when executed, cause the in-vehicle application deployment planner of the vehicle to:

remove another vehicle software application previously deployed to the vehicle; and deploy the vehicle software application to one or more ECUs of the vehicle in accordance with the dynamically generated deployment plan.

9. The method of claim 6, wherein the vehicle further comprises a plurality of ECUs and wherein the said generating the deployment plan comprises:

determining different runtime architectures of the plurality of ECUs, wherein the deployment plan is configured to enable an in-vehicle orchestrator of the vehicle to employ a deployment adapter framework to interface with different runtime architectures of the plurality of ECUs.

10. The method of claim 9, wherein at least one of the different runtime architectures of the plurality of ECUs is an Open Container Initiative (OCI) framework architecture, wherein the vehicle software application comprises one or more container images formatted according to an OCI format.

11. The method of claim 6, wherein said dynamically generating the deployment plan is performed by a cloud-based dynamic vehicle software deployment planner, the method further comprising:

training one or more machine learning (ML) models used by the dynamic vehicle software deployment planner based on the received stream, wherein the deployment plan for the vehicle software application is dynamically generated based, at least in part, on ML inferences generated from the one or more ML models.

12. The method of claim 11, wherein said training the one or more ML models comprises:

training the one or more ML models based on current and historical updates to the ECU configuration of the vehicle and current and historical diagnostic data of the vehicle, wherein the deployment plan for the vehicle software application is generated based, at least in part, on ML inferences generated from the current and historical updates and the current and historical diagnostic data.

13. The method of claim 11, wherein said training the one or more ML models comprises:

training the one or more ML models based on ECU configurations indicated in the stream for a plurality of vehicles in a fleet and diagnostic data of the plurality of vehicles, wherein the deployment plan for the vehicle software application is generated based, at least in part, on ML inferences generated taking into account the ECU configurations and the diagnostic data from the plurality of vehicles of the fleet.

14. The method of claim 6, further comprising:

generating a virtual replica of the vehicle based on the ECU configuration and diagnostic data of the stream; and testing, using the virtual replica, the deployment of the vehicle software application based on the deployment plan.

15. The method of claim 6, further comprising:

determining, based on the ECU configuration and diagnostic data of the stream, for a plurality of vehicle software applications in a vehicle applications store, one or more feasible vehicle software applications that are able to be deployed in the vehicle, wherein the vehicle software application to be deployed is chosen to be deployed from the one or more feasible vehicle software applications.

16. The method of claim 6, further comprising:

determining based on the ECU configuration and diagnostic data of the stream, one or more feasible deployment options for the vehicle software applications, wherein the one or more feasible deployment options comprise options to change one or more of:

an arrangement of vehicle software deployed in the vehicle, a collection of vehicle software deployed in the vehicle, or a specification of a vehicle hardware component.

17. One or more non-transitory, computer-readable storage media, storing program instructions that when executed on or across one or more processors cause the one or more processors to implement a dynamic vehicle software deployment planner that implements:

sending, from a vehicle of a fleet of vehicles to the dynamic vehicle software deployment planner, a stream of vehicle data indicating an electronic control unit (ECU) configuration of the vehicle of the fleet and indicating diagnostic data of the vehicle of the fleet, wherein the diagnostic data comprises information indicating available capacity or performance of one or more electronic control units (ECUs);

receiving a deployment plan for a distributed vehicle software application that has been dynamically generated, based on the indications of the stream, by the dynamic vehicle software deployment planner, and the deployment plan indicates destinations for deploying localized execution plans to the one or more ECUs, based on the available capacity or performance of the one or more ECUs, in which the respective ones of components of the distributed vehicle software application are to be deployed;

relaying the localized execution plans to the one or more ECUs for deploying the components of the distributed vehicle software application based on the destinations indicated in the deployment plan; and implementing, via an in-vehicle application deployment planner of the vehicle, the localized execution plans, based on the deployment plan to install the distributed vehicle software application on the vehicle.

18. The one or more non-transitory, computer-readable storage media of claim 17, wherein the program instructions that when executed cause the one or more processors to further implement:

determining, based on software dependencies for the components of the distributed vehicle software application, an order in which the components are to be deployed to the one or more ECUs, wherein the deployment plan comprises one or more indications of software dependencies to be used to determine the order.

19. The one or more non-transitory, computer-readable storage media of claim 17, wherein the vehicle further comprises a plurality of ECUs and an in-vehicle orchestrator of the vehicle employs a deployment adapter framework to interface with different runtime architectures of the plurality of ECUs.

20. The one or more non-transitory, computer-readable storage media of claim 17, wherein the program instructions that when executed cause the one or more processors to further implement:

receiving a different deployment plan, wherein the different deployment plan comprises instructions to deploy another distributed vehicle software application in a different deployment configuration;

removing the vehicle software application previously deployed; and deploying the other vehicle software application to one or more ECUs of the vehicle based on the different deployment plan.

* * * * *